US009699441B2

(12) United States Patent
Inaba

(10) Patent No.: US 9,699,441 B2
(45) Date of Patent: Jul. 4, 2017

(54) STEREOSCOPIC IMAGING DEVICE

(76) Inventor: Minoru Inaba, Tochigi-ken (JP)

( * ) Notice: Subject to any disclaimer, the term of this patent is extended or adjusted under 35 U.S.C. 154(b) by 742 days.

(21) Appl. No.: 13/512,386

(22) PCT Filed: Nov. 25, 2010

(86) PCT No.: PCT/JP2010/071529
§ 371 (c)(1),
(2), (4) Date: Jun. 25, 2012

(87) PCT Pub. No.: WO2011/068139
PCT Pub. Date: Jun. 9, 2011

(65) Prior Publication Data
US 2012/0257024 A1    Oct. 11, 2012

(30) Foreign Application Priority Data

Jan. 12, 2009  (JP) .................................. 2009-274001
Jan. 21, 2010  (JP) .................................. 2010-011139

(51) Int. Cl.
*H04N 13/02*    (2006.01)
*H04N 5/232*    (2006.01)

(52) U.S. Cl.
CPC ..... *H04N 13/0239* (2013.01); *H04N 5/23212* (2013.01); *H04N 13/0296* (2013.01)

(58) Field of Classification Search
CPC ................................................ H04N 5/23212
See application file for complete search history.

(56) References Cited

U.S. PATENT DOCUMENTS 5,119,189 A *  6/1992  Iwamoto et al. ............... 348/47
6,177,952 B1 *  1/2001  Tabata et al. ................... 348/47

FOREIGN PATENT DOCUMENTS

JP    03-119890    5/1991
JP    05-288532    11/1993
(Continued)

*Primary Examiner* — Chikaodili E Anyikire
*Assistant Examiner* — Berteau Joisil
(74) *Attorney, Agent, or Firm* — Fattibene and Fattibene LLC; Paul A. Fattibene

(57) ABSTRACT

Disclosed is a stereoscopic imaging device which answers the need for system compatibility over the entire range of long-distance (telescopic) imaging to close-up imaging, and which can faithfully reproduce stereoscopic images on the display side without adjustment. To that end, stereoscopic imaging device is disclosed in which the imaging lens optical axes (phi (L), (R)) in an imaging unit provided with imaging lenses and imaging elements (S) are arranged so as to be laterally parallel, and the distance between the optical axes ($D_L$) is set to the interpupillary distance (B) of a human. One reference window ($W_{ref}$) is defined as a virtual view frame in the image viewfield of said imaging unit. In a state in which said reference window ($W_{ref}$) is projected to form reduced images by means of the left and right imaging lenses, the left and right imaging elements (S) are arranged to match the width of the left and right projected images ($I_{ref}(L)$ and $I_{ref}(R)$) of the reference window, and left and right image data is read and sent as reference stereoscopic image data. Also disclosed is a stereoscopic imaging device which is based on the aforementioned stereoscopic imaging device and which enlarges or reduces the distance between optical axes to greater or smaller than the interpupillary distance and is adapted for a wide range of imaging, from long-distance imaging to close-up imaging.

17 Claims, 14 Drawing Sheets

(56) References Cited

FOREIGN PATENT DOCUMENTS

| | | |
|---|---|---|
| JP | 2001-147401 | 5/2001 |
| JP | 2006-184434 | 7/2006 |

* cited by examiner

F I G. 1
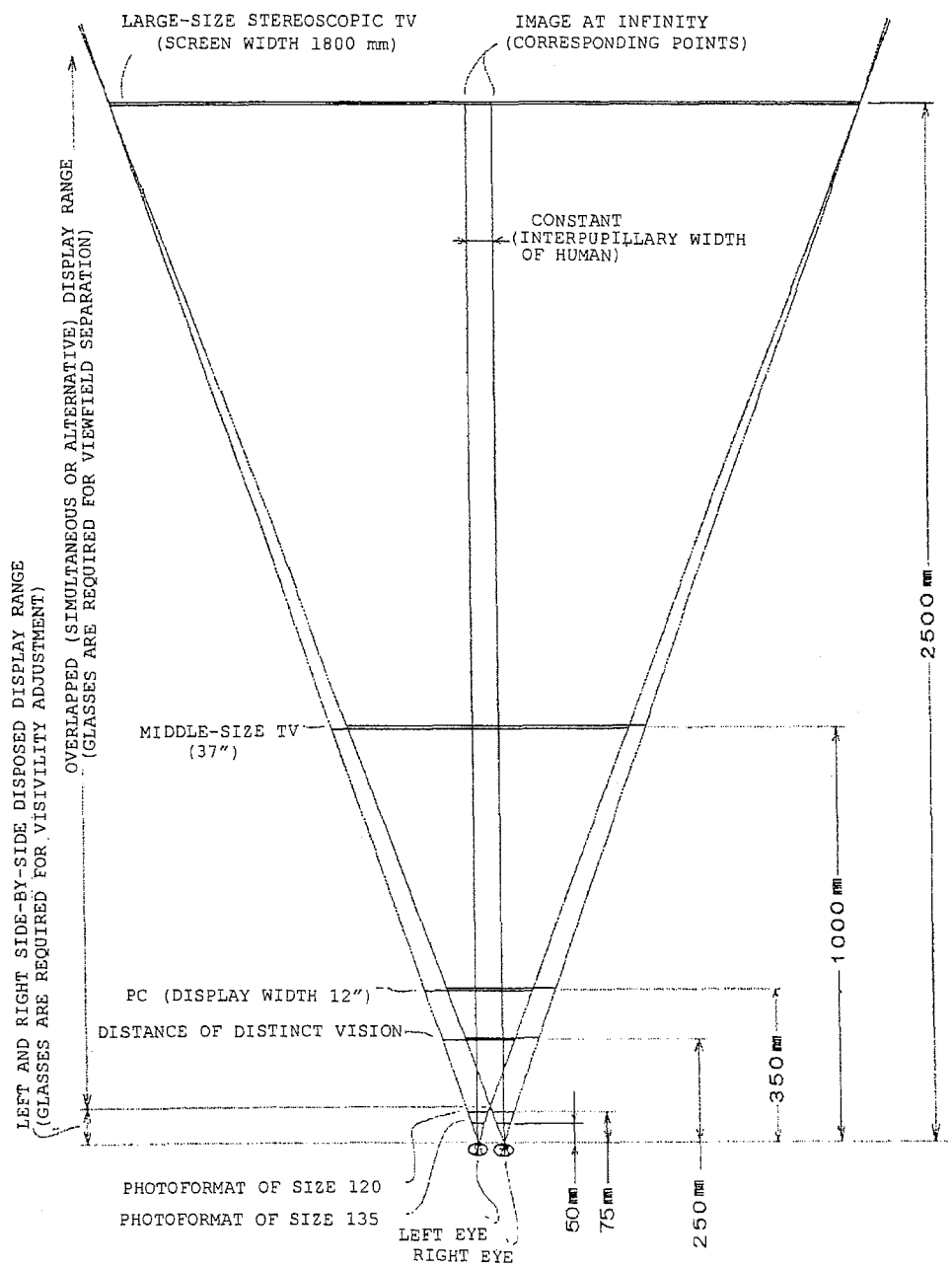

BROKEN LINE DISPLAY REPRESENTS MODE 0 ($m_0$)
SOLID LINE DISPLAY REPRESENTS MODE 1 ($m_1$)

BROKEN LINE DISPLAY REPRESENTS MODE 0 ($m_0$)
SOLID LINE DISPLAY REPRESENTS MODE 2 ($m_2$)

BROKEN LINE DISPLAY REPRESENTS MODE 1($m_1$)
SOLID LINE DISPLAY REPRESENTS MODE 10($m_{10}$)

BROKEN LINE DISPLAY REPRESENTS MODE 2 ($m_2$)
SOLID LINE DISPLAY REPRESENTS MODE 20 ($m_{20}$)

STEREOSCOPIC IMAGING DEVICE

TECHNICAL FIELD

The present invention relates to a stereoscopic imaging device, and more particularly concerns such a stereoscopic imaging device that can faithfully reproduce stereoscopic images on the display side without adjustment, even when stereoscopic imaging devices of different types are used.

BACKGROUND ART

Conventionally, an electronic stereoscopic imaging display system of a twin-lens stereoscopic view system has been proposed, exhibited and sold. Moreover, in some areas, it seems that a stereoscopic television broadcasting has already been started.

In these conventional electronic stereoscopic imaging and displaying systems, since different systems for every types of devices are used in a mixed manner, it is necessary to adjust images, such as to shift images or the like, on the display side (for example, see Patent Literature 1).

In recent years, even in the case of a hyper stereo camera that is a minor system in the electronic stereoscopic photography field also, an attempt has been made to provide a computerized system thereof and a technique for acquiring optimal stereoscopic images by adjusting the distance between left and right units in accordance with a subject distance at the time of capturing images has been proposed (for example, see Patent Literature 2).

Moreover, on the contrary to the above-mentioned "hyper stereo camera", a micro stereo camera for use in image-capturing a close-up subject, which has its distance between optical axes set smaller than the interpupillary distance of a human has also been proposed (for example, see Patent Literature 3).

CITATION LIST

Patent Literature

Patent Literature 1: Japanese Patent Application Laid-Open No. 08-275207
Patent Literature 2: Japanese Patent Application Laid-Open No. 5-197045
Patent Literature 3: National Publication of International Patent Application No. 2009-047894

SUMMARY OF INVENTION

Technical Problem

An adjusting method in accordance with a conventional method including a technique described in Patent Literature 1 is insufficient, and it is difficult to apply this to practical use.

Patent Literature 2 has described a technique for a stereo camera in which the distance between optical axes of an imaging lens is extended wider than the interpupillary distance of a human in accordance with the focal length of the imaging lens. However, in the Patent Literature 2, although relationships of the distance between optical axes of the imaging lens relative to the subject distance as well as of the distance between optical axes relative to the focal length of the imaging lens have been shown in drawings, no description has been given to the relative positional relationship between the imaging lens and the imaging elements, with the result that it is not clear as to what arrangement the "imaging device" has. Moreover, no explanation has been given as to how to visually confirm a subject image by using a viewfinder or the like at the time of capturing images.

Patent Literature 3 has described a stereo camera in which the distance between optical axes of an imaging lens is set to be smaller than the interpupillary distance of a human so as to be applied to a close-distance image capturing process. However, the description of Patent Literature 3 is exclusively related to a mechanism for use in reducing the distance between optical axes, and no optical explanations as to acquiring optimal stereoscopic image data in a stereoscopic view has been given.

Therefore, even in the case when stereoscopic image devices of different types are used, it is necessary to faithfully reproduce a stereoscopic image on the display side without adjustment. Moreover, in order to provide all the images as stereoscopic images on the display side simultaneously, there are some technical problems to be solved so as to allow stereoscopic images to be applicable to imaging techniques (for example, imaging techniques for use in telescopic lenses or macro imaging process, or the like) currently used in televisions, movies, etc. (conventional monaural techniques), and the present invention has been devised to solve these problems.

Means for Solving the Problems

In order to achieve the above-mentioned object, the present invention has been proposed, and the invention disclosed in Claim 1 provides a stereoscopic imaging device that includes: an imaging unit provided with imaging lenses and imaging elements, with optical axes of the imaging lenses being set laterally in parallel with each other to a distance that is equal to the interpupillary distance of a human, with one reference window being defined as a virtual viewfield frame in the imaging viewfield of the imaging unit, and with the set distance of reference window being determined at an arbitrary distance between a distance 30 times longer than the interpupillary distance and a distance nearer than a distance 50 times longer than the interpupillary distance, and this structure is characterized in that the left and right imaging elements are arranged to match the width of the left and right projected images of the reference window in a state in which the reference window is projected to form reduced images by means of the left and right imaging lenses on the left and right imaging elements so that left and right image data is read and sent as standard stereoscopic image data.

With this structure, by setting the reference window in an imaging unit, such as a stereo camera, the transmission image data is scale-measured (provided with a scale), and sent as standard stereoscopic image data. Therefore, even when the imaging unit, that is, the stereo camera, is individually used, the distance and size of the captured image can be correctly reproduced by an apparatus on the reproduction side, so that image-captured data can be sharedly used as standard stereoscopic image data regardless of the types and sizes of the apparatus.

The invention disclosed in Claim 2 provides a stereoscopic imaging device that is provided with: an imaging unit having imaging lenses and imaging elements, with optical axes of the imaging lenses being set laterally in parallel with each other to a distance that is narrower than the interpupillary distance of a human, and with one reference window being defined as a virtual viewfield frame in the imaging viewfield of the imaging unit, and this structure is characterized in that supposing that the set distance of the reference window is $L_W$, the distance between optical axes of the left and right imaging lenses is $D_R$, the focal length of the imaging lens is f and the focus adjusting amount is $\Delta f$, the set distance of the reference window $L_W$ and the distance between optical axes of the left and right imaging lenses $D_R$ are arranged so as to have a relationship represented by $50>(L_W/D_R)>30$, with the distance $D_S$ of the left and right imaging elements being arranged so as to have a relationship represented by $D_S=D_R(1+(f+\Delta f)/L_W)$, so that left and right image data is read and sent as standard stereoscopic image data.

With this structure, even in the case of close-up imaging with a small subject distance, supposing that the set distance of the reference window is $L_W$ and the distance between optical axes of the left and right imaging lenses is $D_R$, the value of the distance $D_S$ between the left and right imaging elements is specifically found based upon the relationship between these $L_W$, $D_R$, etc. Moreover, the reference window $W_{ref}$ is reduced by the left and right imaging lenses, and projected onto the left and right imaging elements S as an image, with the distance $D_S$ being set in this manner, so that the resulting image is sent as standard stereoscopic image data.

The invention disclosed in Claim 3 provides a stereoscopic imaging device that is provided with: imaging lenses and imaging elements in an imaging unit, with optical axes of the imaging lenses being set laterally in parallel with each other to a distance that is wider than the interpupillary distance of a human, and with one reference window being defined as a virtual viewfield frame in the imaging viewfield of the imaging unit, and this structure is characterized in that supposing that the set distance of the reference window is $L_W$, the distance between optical axes of the left and right imaging lenses is $D_E$, the focal length of the imaging lens is f and the focus adjusting amount is $\Delta f$, the set distance of the reference window $L_W$ and the distance between optical axes of the left and right imaging lenses $D_E$ are arranged so as to have a relationship represented by $50>(L_W/D_E)>30$, with the distance $D_S$ of the left and right imaging elements being arranged so as to have a relationship represented by $D_S=D_E(1+(f+\Delta f)/L_W)$, so that left and right image data is read and sent as standard stereoscopic image data.

Normally, in the case when a subject at a long distance is image-captured, a perspective far and near feeling becomes insufficient; however, in this structure, since the lens distance $D_L$ is set to be greater than the interpupillary distance B of a human, that is, to a state satisfying $D_E>B$, an image-capturing process can be carried out, with the perspective far and near feeling of a long-distance subject being emphasized.

The invention disclosed in Claim 4 provides a stereoscopic imaging device (mode 1) that is characterized in that based upon a structure of the stereoscopic imaging device as a reference (mode 0) in which in imaging units provided with imaging lenses and imaging elements, optical axes of the imaging lenses are set laterally in parallel with each other to a distance that is equal to the interpupillary distance of a human, with one reference window being defined as a virtual viewfield frame in the viewfield of each of the imaging units, and with the left and right imaging elements being arranged to match the widths of the projected images of the reference windows reduced and projected by the respective left and right imaging lenses to be image-formed on the respective left and right imaging elements, so that left and right image data is read and sent as standard stereoscopic image data, the distance between the left and right imaging units is increased so that the distance between optical axes is adjusted to an arbitrary position that is greater than the interpupillary distance of a human.

In this structure, with respect to the left and right imaging units, with the distance between the left and right imaging elements being set to a slightly larger dimension with a constant distance than the distance between optical axes of the left and right imaging lenses (that is, with the imaging units themselves being set in the state of the mode 0), the distance between the left and right units is made greater so as to be set in an arbitrary position (mode 1) with the distance between optical axes being extended longer than the interpupillary distance; the reference window is automatically set in proportion to the distance between optical axes so that it is set to a distance farther than that when the distance between optical axes is in the reference position (mode 0).

The invention disclosed in Claim 5 provides a stereoscopic imaging device (mode 2) that is characterized in that based upon a structure of the stereoscopic imaging device as a reference (mode 0) in which in imaging units provided with imaging lenses and imaging elements, optical axes of the imaging lenses are set laterally in parallel with each other to a distance that is equal to the interpupillary distance of a human, with one reference window being defined as a virtual viewfield frame in the viewfield of each of the imaging unit, and with the left and right imaging elements being arranged to match the widths of the projected images of the reference windows reduced and projected by the respective left and right imaging lenses to be image-formed on the respective left and right imaging elements, so that left and right image data is read and sent as standard stereoscopic image data, the distance between the left and right imaging units is made smaller so that the distance between optical axes is adjusted to an arbitrary position that is smaller than the interpupillary distance of a human.

In this structure, with respect to the left and right imaging units, with the distance between the left and right imaging elements being set to a larger dimension with a constant distance than the distance between optical axes of the left and right imaging lenses (that is, with the imaging units themselves being set in the state of the mode 0), the distance between the left and right units is made smaller so that the distance between optical axes is set to be smaller than the interpupillary distance (mode 2); thus, the reference window is automatically set in proportion to the distance so that it is set to a distance nearer than that when the distance between optical axes is in the reference position (mode 0).

The invention disclosed in Claim 6 provides a stereoscopic imaging device that has a structure in which zoom lens are respectively attached to left and right paired imaging units of a stereoscopic imaging device, with optical axes of the zoom lenses being in parallel with each other, and with the distance between the imaging units being variably changed, so that by detecting an adjusted value of the zooming ratio of the zoom lens by a position detector, such as a potentiometer, an encoder, etc., the distance between the left and right units is automatically adjusted by a servomotor in accordance with the adjusted value.

With this structure, by adjusting the zooming ratio, the distance between the left and right units is automatically adjusted so that the device can be used with the same operation feeling as that of a normal monaural camera.

The invention disclosed in Claim 7 provides the stereoscopic imaging device disclosed in Claim 6 that has a structure in which the focal point adjusting distance of the left and right imaging lenses is fixed to a distance that is farther from the reference window.

With this structure, no focal point adjustment is required so that the focal point position of the imaging lens can be fixed (that is, the positional relationship in the optical axis direction of the imaging lens relative to the camera can be fixed to a constant position).

The invention disclosed in Claim 8 provides the stereoscopic imaging device disclosed in Claims 4, 5 and 6, which has a structure in which installation reference surfaces of the imaging units are formed at respective longitudinal positions of a main body so as to have a longitudinally symmetric structure.

With this structure, either one of the left and right units may be produced, while the other unit is prepared by longitudinally inverting the unit so as to be used; thus, it becomes possible to reduce the manufacturing costs.

The invention disclosed in Claim 9, which relates to the invention disclosed in any one of Claims 1 to 6, provides a stereoscopic imaging device in which by using the imaging elements having a width larger than the width of a projected image of the reference window, left and right stereoscopic image data corresponding to the width of the projected image of the reference window, or the like, is selectively read and sent as standard stereoscopic image data.

With this structure, the imaging elements actually having a width slightly larger than the width of the projected image of the reference window is used, and by setting a readout range at the time of a reading process, standard stereoscopic image data can be positively sent.

The invention disclosed in Claim 10, which relates to the invention disclosed in any one of Claims 1 to 6, is further provided with a structure in which on a display screen of a stereoscopic monitor installed on a stereoscopic imaging device, or on a display screen of a stereoscopic monitor connected to a stereoscopic imaging device through radio communication or wire communication, at the same left and right positions of left and right images, the same left and right viewing reference patterns, each mainly composed of longitudinal lines, are displayed so as to be overlapped with displayed images by means of software (in the case when left and right display screen frames are overlapped with each other in the same manner, the left and right viewing reference patterns are overlapped with each other and viewed as one pattern), and a viewing reference pattern signal is only used for a monitor display, with only the stereoscopic image data being sent.

With this structure, even in the case when the distance between the optical axes of the left and right imaging lenses is set to a distance larger than the interpupillary distance of a human, or even in the case when it is set to a distance smaller than that, the viewing reference pattern on the stereoscopic viewfield is always viewed at the set position of the reference window on the stereoscopic viewfield. That is, the position of the reference window can be visually confirmed by the viewing reference pattern so that an optimal stereoscopic image can be always captured.

Effects of the Invention

In accordance with the invention disclosed in Claim 1, transmission image data is scale-measured (provided with a scale) automatically on the imaging device side, and sent as standard stereoscopic image data so that the distance and size of the captured image can be correctly reproduced on a display device, and the resulting advantage is that even when display devices of different types are used, a stereoscopic image can be faithfully reproduced on the display device side.

In accordance with the invention disclosed in Claim 2, the distance between optical axes of the left and right imaging lenses is set to a distance narrower than the interpupillary distance of a human, and based upon the set distance $L_W$ of the reference window, the distance $D_R$ between optical axes of the left and right imaging lenses, etc., the distance $D_S$ between the left and right imaging elements is found, and by reading left and right imaging data from the left and right imaging elements set with the distance $D_S$, appropriate standard stereoscopic image data can be advantageously sent even in the case of a close-distance imaging range.

In accordance with the invention disclosed in Claim 3, by setting the lens distance $D_L$ (distance between optical axes) to a value greater than the interpupillary distance B of a human, that is, to $D_E$>B, it becomes possible to carry out an image-capturing process, with a perspective far and near feeling of a long-distance subject being emphasized. Normally, in the case when a subject at a long distance is image-captured, the perspective far and near feeling becomes insufficient (when a human normally views along-distance subject, the perspective far and near feeling becomes insufficient, and the same is true for viewing an enlarged subject through a binocular); however, by setting the distance between optical axes to a value greater than the interpupillary distance, an effect is obtained by which even in the case of image-capturing a long-distance subject, a stereoscopic image, with its perspective far and near feeling being emphasized, can be obtained.

The invention disclosed in Claim 4 is effectively used for image-capturing a long-distance subject having insufficient perspective far and near feeling so as to emphasize the perspective far and near feeling, and in its structure, it is simply necessary to separate the left and right imaging units from each other, while being kept in parallel with each other (with an offset value between the center of imaging elements and the optical axis being kept at a constant state), so that the distance between optical axes is set to be greater than the interpupillary distance of a human, and in this case, since the distance between optical axes may be prepared as an arbitrary distance, optical and visual problems can be completely solved by using a very simple structure.

The invention disclosed in Claim 5 is effectively used for image-capturing a close-distance subject, and even in the case of the close-distance imaging, stereoscopic image data having a superior joined state of left and right viewfields (images) can be obtained, and in its structure, it is simply necessary to make the left and right imaging units closer to each other, while being kept in parallel with each other (with an offset value between the center of imaging elements and the optical axis being kept at a constant state), so that the distance between optical axes is set to an arbitrary distance that is smaller than the interpupillary distance of a human; thus, optical and visual problems can be completely solved by using a very simple structure.

In accordance with the invention disclosed in Claim 6, zoom lenses are respectively attached to left and right imaging units that are attached to a guide way in parallel with each other, with the distance between them being variably changed, and by detecting an adjusted value of the magnification setup value of the zoom lens by a position detector, such as a potentiometer, etc., the distance between the units is automatically adjusted by driving a servomotor in accordance with the detected value so that the magnification of the imaging lenses is adjusted; thus, the distance between optical axes is automatically set in response to the magnification adjusted position (zooming ratio) of the imaging lens. Therefore, it is possible to provide very simple operations at the time of capturing images.

In accordance with the invention disclosed in Claim 7, in the stereoscopic imaging device disclosed in Claim 6, the focal point adjusting distance is fixed to a distance that is farther from the reference window so that the operability at the time of capturing images can be effectively improved by fixing the focal point adjustment.

In accordance with the invention disclosed in Claim 8, the imaging units are allowed to have a longitudinally symmetric structure, and without the necessity for preparing left and right two kinds of units, the same right and left units can be used, with one of the units being longitudinally inverted, so that it becomes possible to reduce the production costs and costs for transportation, and also to eliminate the necessity of preparing left and right two kinds of units in the case when spare units are prepared; thus, maintenance and managing operations are advantageously improved.

In accordance with the invention disclosed in Claim 9, in addition to the effects of the inventions of Claims 1 to 6, the imaging elements having a width slightly larger is used, and by setting a readout range at the time of a reading process, the degree of freedom in designing the devices can be increased, and the production processes can be easily carried out with high precision.

In accordance with the invention disclosed in Claim 10, in addition to the effects of the inventions disclosed in any one of Claims 1 to 6, the visibility of the state of a stereoscopic view can be remarkably improved, and the resulting effect is that upon capturing images, the imaging process can be carried out while viewing images with the same stereoscopic feeling as that of a viewer who is actually watching a stereoscopic television on the display side.

BRIEF DESCRIPTION OF THE DRAWINGS

Drawings illustrate a stereoscopic imaging device relating to embodiments of the present invention.

FIG. 1 is a conceptual drawing in a stereoscopic view relating to technical matters in accordance with the present embodiments.

FIG. 2(a) is a drawing that shows the reference dimension display screen; and FIG. 2(b) is a drawing that shows a stereo camera.

MODES FOR CARRYING OUT THE INVENTION

Figure 2:
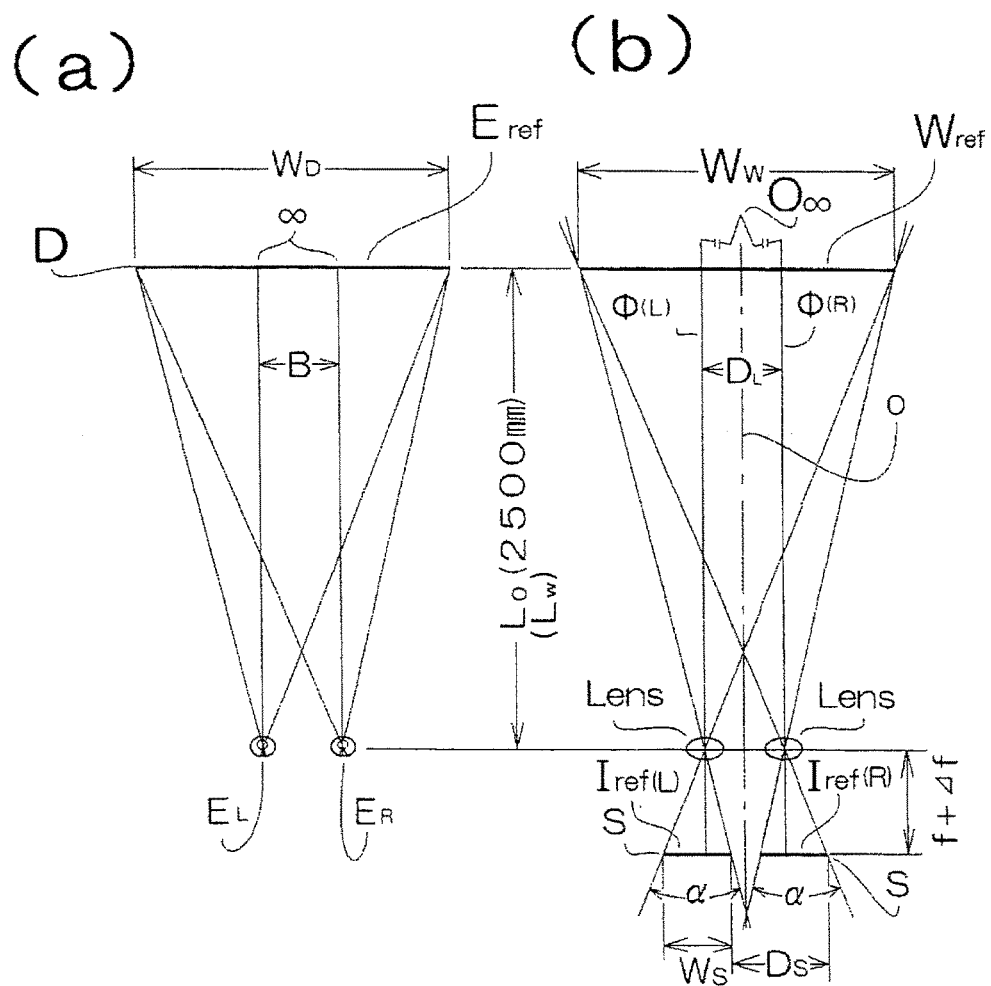
FIGS. 2(a) and 2(b) are drawings that show a relationship between a reference dimension display screen (a large-size stereoscopic TV in the drawing) and a stereo camera that transfers standard stereoscopic image data of FIG. 1.

In order to achieve an object for faithfully reproducing stereoscopic images on the display side without adjustment even in the case of using different types of stereoscopic imaging devices, the optical axes in an imaging unit provided with imaging lenses and imaging elements are arranged so as to be laterally in parallel with each other, and have a distance that is equal to the interpupillary distance of a human, and one reference window serving as a virtual viewfield frame is defined in the image viewfield of the imaging unit, and in a state in which the reference window is projected to form reduced images on the imaging elements of the respective left and right sides by means of the left and right imaging lenses, the left and right imaging elements are arranged to match the width of the left and right projected images of the reference window so that left and right image data is read and sent as standard stereoscopic image data.

Example 1

The following description will discuss one preferred example of the present invention. The characteristic of the stereoscopic imaging device relating to the example of the present invention lies in that, even in the case when the sizes of imaging elements of a stereo camera and the display ranges and screen sizes of stereoscopic imaging devices are different, stereoscopic data can be compatibly used, and in that in order to compatibly recognize the distance feeling and dimension of all kinds of stereoscopic images, a reference window is set at the time of imaging. Moreover, this reference window is image-captured as a view frame (left and right image frames), and sent as standard stereoscopic data required for displaying. Then, on the display side, by displaying the standard stereoscopic image data on a screen having a reference dimension equivalent to the reference window on the imaging side, a faithful stereoscopic feeling can be reproduced.

For example, in FIGS. 2(a) and 2(b), when it is supposed that the width of a reference window $W_{ref}$ is $W_W$, the width (width of an imaging element) of an image $I_{ref}$ within the reference window projected to an imaging element S is $W_S$ and the width of a display screen width $E_{ref}$ of the reference dimension is $W_D$, the imaging scale factor is given as $r=W_S/W_W$, and the display scale factor is given as $R=W_D/W_S$, and $r\times R=1$ is satisfied. In accordance with the above equation, it can be understood that regardless of the size of the width $W_S$ of the imaging element S, sending image data from the stereo camera can be easily formed into standard stereoscopic image data.

FIG. 1 is a conceptual drawing in a stereoscopic view. Supposing that a large-size stereoscopic TV (display width: 1800 mm) shown in the drawing is a television with a reference dimension display screen, display screens having respective sizes and layouts thereof have a relationship shown in the drawing.

Figure 3:
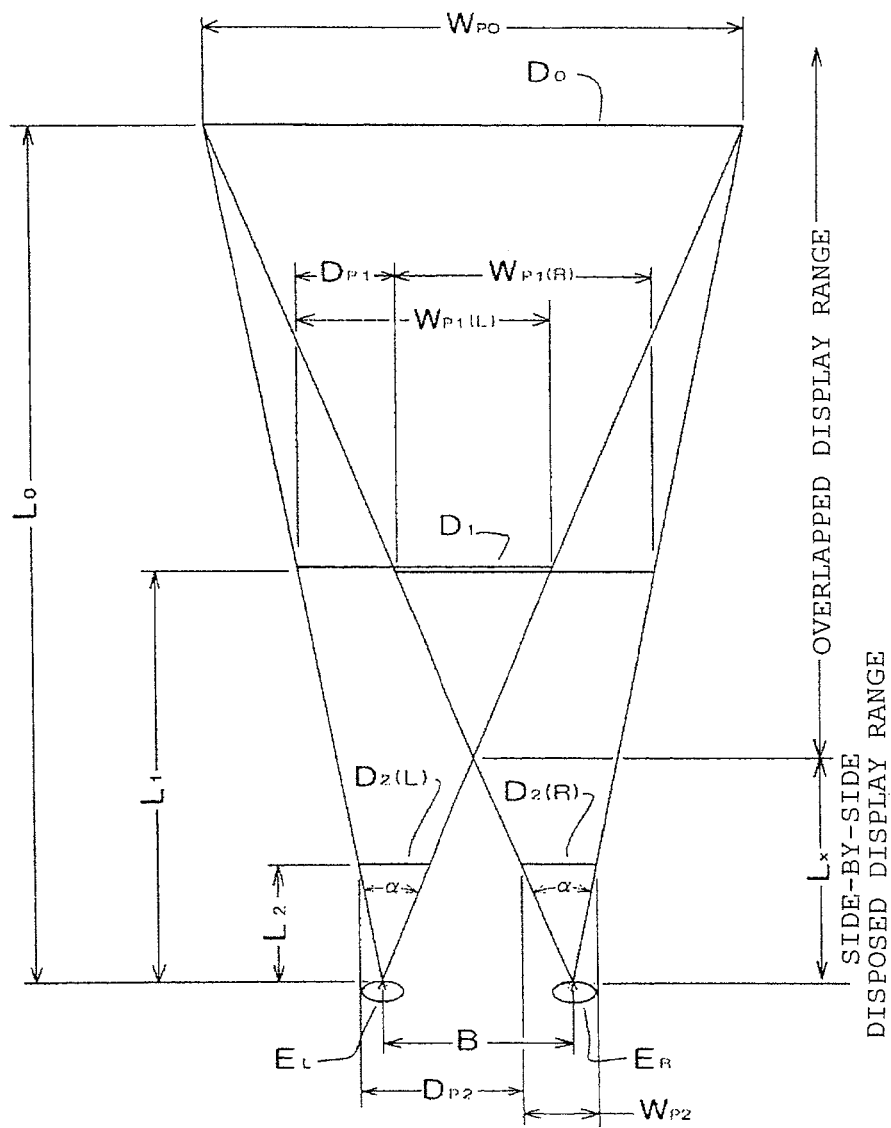
FIG. 3 is a detailed explanatory drawing of FIG. 1.

FIG. 3 shows the dimensions and layout relationship of FIG. 1 more specifically, and in FIG. 3, the size is indicated by a dimension ratio that is made greater as it comes closer to the position of an observer relative to the actual dimension ratio. This method is taken so as to avoid complexity upon forming the drawing.

In FIG. 3, a distance $L_X$ from the eyes of the observer to a border line between a left and right side-by-side disposed display range and an overlapped display range is represented by the following equation:

$$L_X=L_0/(1+W_{P0}/B)$$ [Equation 1]

In this equation, supposing that $L_0=2500$ mm, and $W_{P0}=1800$ mm, $L_X=2500/(1+1800/58)=78.04$ mm is obtained when the interpupillary distance dimension (distance between left and right eyes) is represented by $B=58$, and when the interpupillary distance dimension is represented by $B=72$, $L_X=2500/(1+1800/72)=96.15$ mm is obtained.

Within the left and right side-by-side disposed display range, a partition wall for dividing the left and right viewfields is required, and the actual viewing distance is virtually limited to about 75 mm. In this case, since 75 mm is very close to the distance of distinct vision, a visibility adjusting loupe is required, and since the loupe having a focal length slightly larger than the viewing distance is appropriately used, the focal length of the loupe to be used in this case is desirably set to about 80 mm. Moreover, although the interpupillary distance (stereo base) B has a slight difference depending on the respective observers, a slight difference between the interpupillary distance B and a lateral distance between corresponding points of an image at infinity can be negligible in the case when the viewing distance is large (overlapped display range).

Moreover, in the left and right side-by-side disposed display range, although the margin in a difference from the interpupillary distance B is small, the difference can be alleviated by adjusting the distance between visibility adjusting lenses.

The left and right screen distance of a stereoscopic image (stereo photograph), that is, a picture distance, is represented by the following relationship between the left and right interpupillary distance B shown in FIG. 3 and a distance $L_0$ to a display $D_0$ of reference dimension. The picture distance $D_{PN}$ of a display $D_N$ disposed with an arbitrary distance $L_N$ is represented by a value obtained by the following equation:

$$D_{PN}=B(1-L_N/L_0).$$ [Equation 2]

In FIG. 3, although the respective screen widths $W_{P1}$ and $W_{P2}$ are proportional to the distance from the eyes of the observer, light rays to enter the respective left and right eyes have the same viewing angle α shown in the drawing that sandwiches the display $D_0$ in reference dimension, the respective apparent screen widths shown in FIG. 3 have the following relationship and appear to have the same size:

$$W_{P0}=W_{P1}=W_{P2}.$$

As described above, by displaying standard stereoscopic image data on a display screen in a reference dimension of the TV (large-size TV shown in FIG. 1) in a manner so as to have a layout relationship as shown in FIG. 1, compatible data can be used overall the display ranges from the overlapped display range in which left and right images are displayed in an overlapped manner to the left and right side-by-side disposed display range having individual left and right display surfaces. In this case, it is only necessary for the respective displays shown in the drawing to layout (position and width) and display the standard stereoscopic image data in accordance with conditions respectively specified on the left and right sides.

FIGS. 2(a) and 2(b) are explanatory drawings that show a stereo camera that serves as means for acquiring stereoscopic image data having a positional relationship shown in FIG. 1. FIG. 2(a) is a drawing that shows completely the same state as that of the state of a stereoscopic view of FIG. 1, and FIG. 2(b) is a relational drawing in the case of using a stereo camera. Now, supposing that a display $E_{ref}$ of the corresponding reference window of FIG. 2(a) is defined as a display screen in a reference dimension of a television (large-size stereoscopic TV shown in FIG. 1), that a reference window $W_{ref}$ is set in the stereo camera of FIG. 2(b) and that the distance between the left and right imaging lenses of the camera is set to the interpupillary distance B, a conjugated relationship holds between a distance from the display $E_{ref}$ of the corresponding reference window of FIG. 2(a) to each of the left and right eyes $E_L$ and $E_R$ of the observer and a distance from the reference window $W_{ref}$ of the width $W_W$ of FIG. 2(b) to each of the left and right imaging lenses $L_L$ and $L_R$. Consequently, image data on imaging elements disposed within the viewing angle α between the left and right sides is equal to that in the case when a human actually observes the display screen in a reference dimension of the television (large-size stereoscopic TV shown in the drawing) of FIG. 1. Moreover, the size (width) of each of imaging elements disposed within the viewing angle α is determined by the position in the light axis direction at which the imaging element is disposed.

In FIG. 2(b) the width $W_S$ of the imaging element is calculated by the following equation:

$$W_S=W_W\times(f+\Delta f)/L_W.$$ [Equation 3]

Moreover, supposing that the distance (lens distance) between the left and right imaging lens optical axes is $D_L$, the distance (picture distance in an inverted state) between the left and right imaging elements, that is, $D_S$ in the drawing is calculated by the following equation, and a state of $D_S>D_L$ is held.

$$D_S=D_L(1+(f+\Delta f)/L_W)$$ [Equation 4]

With respect to the stereoscopic image, the focal point should be adjusted so as to clearly see over the entire range of a long-distance image to a close-up image. For this purpose, the aperture (diaphragm) of the imaging lens should be made smaller so that image-capturing is carried out in a pan-focus state. In the case of image-capturing in the pan-focus state, the above-mentioned term $f+\Delta f$ may be set to $f+\Delta f\approx f$.

The image projected onto the imaging elements is in an inverted state, and when rotated at each of the left and right positions by 180° so as to be set to an upright state, the left and right screen distance, that is, a picture distance (display side=upright image state), becomes smaller than the interpupillary distance B of a human. Moreover, two triangles (two triangles portions of which are overlapped with each other) composed of lines that pass through the reference window $W_{ref}$ shown in FIG. 2(b) and main points of the left and right respective imaging lenses and sandwich the window width $W_W$ of the reference window $W_{ref}$ and two triangles composed of lines that pass through the main points of the left and right respective imaging lenses and sandwich the two ends of left and right imaging elements S and surfaces of the imaging elements themselves form similar figures, with the main points of the left and right imaging lenses serving as the points of symmetry. Furthermore, left and right units are laterally symmetrical, with the center line 0 shown in the drawing serving as a line of symmetry; therefore, when the drawing is folded along the center line 0 of the drawing face serving as a folding line, the left and right optical axes Φ (L) and Φ (R) are made coincident with each other so that the left and right sides are overlapped with each other. Thus, when stereoscopic images that are image-captured by the stereo camera shown in FIG. 2(b) are alternately displayed on the same screen position of a display screen in reference dimension of a TV (large-size stereoscopic TV shown in the drawing) shown in FIG. 1 in a time-sharing manner, or simultaneously displayed in an overlapped manner by using polarization or the like, and when these are viewed on the respective left and right screens by the left and right eyes respectively through viewfield separation glasses, corresponding points of an image at infinity are automatically displayed with the interpupillary distance of a human. Consequently, a stereoscopic image in an optimum state can be reproduced. Additionally, no specific means is required for projecting the images at the same positions in reference dimension, and it is only necessary to display the images located on the imaging elements S shown in FIG. 2(b) on the display of FIG. 2(a) with a display scale of a simple ratio $W_D/W_S$ between the screen width $W_D$ and the width $W_W$ of the imaging element of the display D.

Moreover, each of the left and right screen widths of the respective sizes shown in FIG. 1 is determined by the ratio of the layout distance of each of the display devices and the distance of a reference dimension display screen to the television ($L_1/L_0=W_{P1}/W_{P0}$ in FIG. 3); therefore, since each of the left and right display screen widths is represented by a simple ratio, calculations are easily carried out.

As shown in FIG. 1, since the corresponding points of an stereoscopic image at infinity should be displayed with the interpupillary distance of a human in all the ranges, equations, infinity=interpupillary distance=distance between optical axes of left and right imaging lens, are satisfied, and since light rays from the corresponding points of an image at infinity that are made incident on the left and right imaging lenses of the stereo camera are in parallel with each other, the corresponding points of the image at infinity projected onto the imaging elements have a distance equal to the distance between the optical axes. Therefore, in any of display sizes, in the case when setting is made between the left and right display screens so as to satisfy the distance between corresponding points of an image at infinity=the interpupillary distance of a human, it is only necessary to set the optical axis center positions of the left and right imaging lens on the respective left and right imaging elements at positions that make the distance from the left side to the right side on the display screen equal to the interpupillary distance of a human. In other words, in stereoscopic display devices having any screen size, based upon the respective left and right optical axes of a stereo camera, the distance corresponding to the left and right optical axes of an image unit needs to be displayed with a dimension equal to the interpupillary distance of a human between the left and right sides of a reproducing screen.

However, although the above equation, infinity=interpupillary distance, is theoretically satisfied, the interpupillary distance of a human is actually varied in many cases (although virtually constant regardless of races, the interpupillary distance of an infant is narrow); therefore, in a stereoscopic image display device, the distance relating to an image at infinity should be set so as to match the narrowest interpupillary distance of a human (slightly narrower than the narrowest interpupillary distance). This is because, when a human normally views an object, he or she cannot view it with gazing lines of the left and right eyes being mutually widened beyond the parallel lines (not absolutely, but it is not easy to do so). For this reason, in the case when the distance relating to an image at infinity to be displayed on the stereoscopic display device is set to match the largest interpupillary distance of a human (the distance relating to an image at infinity is set to be equal to the interpupillary distance of a human), a human having a narrow interpupillary distance has difficulty in viewing. For this reason, in order to express a natural stereoscopic feeling, although the distance relating to an image at infinity on the stereoscopic image display device is optimally set to satisfy the equation the interpupillary distance=the distance between the optical axes of a stereo camera; however, as described above, the optical setting is not always satisfactory for everybody to view things. Therefore, as to what dimension is used for the distance between corresponding points of an image at infinity on the left and right screens of the stereoscopic display device, a determination needs to be made, for example, by taking into consideration from how old (for infant) persons are allowed to view such a stereoscopic image.

Moreover, upon viewing stereoscopic images with two eyes, the limit value of the virtual near point that allows an image at infinity and a close-up image to be viewed in a joined manner is about 30 times the interpupillary distance. That is, the limit value in the close distance direction of the setting distance of the reference window is set to 30 times the interpupillary distance, and in the case when the setting is made at a distance closer than this limit, it becomes difficult to view a long-distance image and a close-up image in a joined manner. In contrast, the limit value in the far distance direction of the reference window is set to virtually 50 times the interpupillary distance of a human. It seems that the setting can be made as far as desired in a long-distance direction; however, in the case when a subject image (generally recognized as a jumping-out stereoscopic image) located nearer from the reference window is viewed, the image frames (reference window) are not made coincident with each other between the left and right viewfields, with the result that the subject image is undesirably viewed as deviated double images.

Supposing that the interpupillary distance of a human is 65 mm, the distance 30 times the interpupillary distance is 65×30=1950 mm so that the limit value of the virtual near point is virtually 2 meters, and in the case when an image-capturing process is carried out within a distance of 2 meters or less, the distance between the left and right optical axes of the imaging device is optimally set to a value smaller than the interpupillary distance of a human. In this case, as described earlier, the limit value in the long distance direction is given as virtually 50 times the interpupillary distance so that 65×50=3250 mm is obtained. Although these dimensions are slightly varied depending on the set value of the interpupillary distance, and although they are out of the value of 30 to 50 times the interpupillary distance when the imaging lens is exchanged, the actual conditions of the stereoscopic view (should be viewed with the near point being set to 30 times to 50 times the interpupillary distance) are related to phenomena on the actual viewer side; therefore, even in the case when the distance between the optical axes (lens distance) of the left and right imaging lenses is set to a small value in this manner, or even in the case when the distance is set to a large value, the above equation 4 is applied to the distance between the left and right imaging elements. Then, the distance between the optical axes (lens distance) of the left and right lenses of the imaging device can be displayed as the interpupillary distance of a human on the display side.

Additionally, the lens distance corresponding dimension of the imaging device is optimally displayed as the interpupillary distance of a human on the display side; however, in most cases, it is better to set the distance on the display side as a value slightly shorter than the interpupillary distance. This is because in the case when a subject whose image capturing distance is too close relative to the lens distance of the imaging device is image-captured, the perspective far and near feeling is emphasized (in this case, it is of course emphasized, and it also becomes impossible to form a joined view with a long-distance image). In this case, by reducing the interpupillary distance on the display side (by reducing the distance of images at infinity of left and right images), the perspective far and near effects on the display side are cancelled so that suitable perspective far and near effects are obtained. At the same time, there are some persons whose interpupillary distance is narrow, as described earlier. With this regard, viewing stereoscopic photographs by the use of a stereo slide viewer or the like is advantageous because by adjusting the distance of the viewing lenses, viewing processes in a wide range are available. In actual circumstances, however, since the viewing distance is comparatively large in the case of televisions and the like, a slight difference in the interpupillary distance seems to cause no problems.

In the case when the lens distance $D_L$ is set to be narrower than the interpupillary distance B of a human for use in close-up imaging, the set distance $L_W$ of the reference window $W_{ref}$ is of course is a distance nearer than that shown in FIG. 2(b). However, on the display side, a display may be prepared as a state shown in FIG. 2(a)($L_0$=2.5 meters) without causing any problems. In contrast, a subject at a long distance is image-captured, the perspective far and near feeling becomes insufficient (when a human normally views a long-distance subject, the perspective far and near feeling becomes insufficient, and the same is true for viewing an enlarged subject through a binocular); therefore, in an attempt to capture an image of a long-distance subject, with the perspective far and near feeling being emphasized, the lens distance $D_L$ can be set to be greater than the interpupillary distance B of a human, that is, to a state satisfying $D_E$>B, in the same manner as described earlier. In this case also, a display state as shown in FIG. 2(a) can be obtained in the same manner as described earlier.

Figure 4:
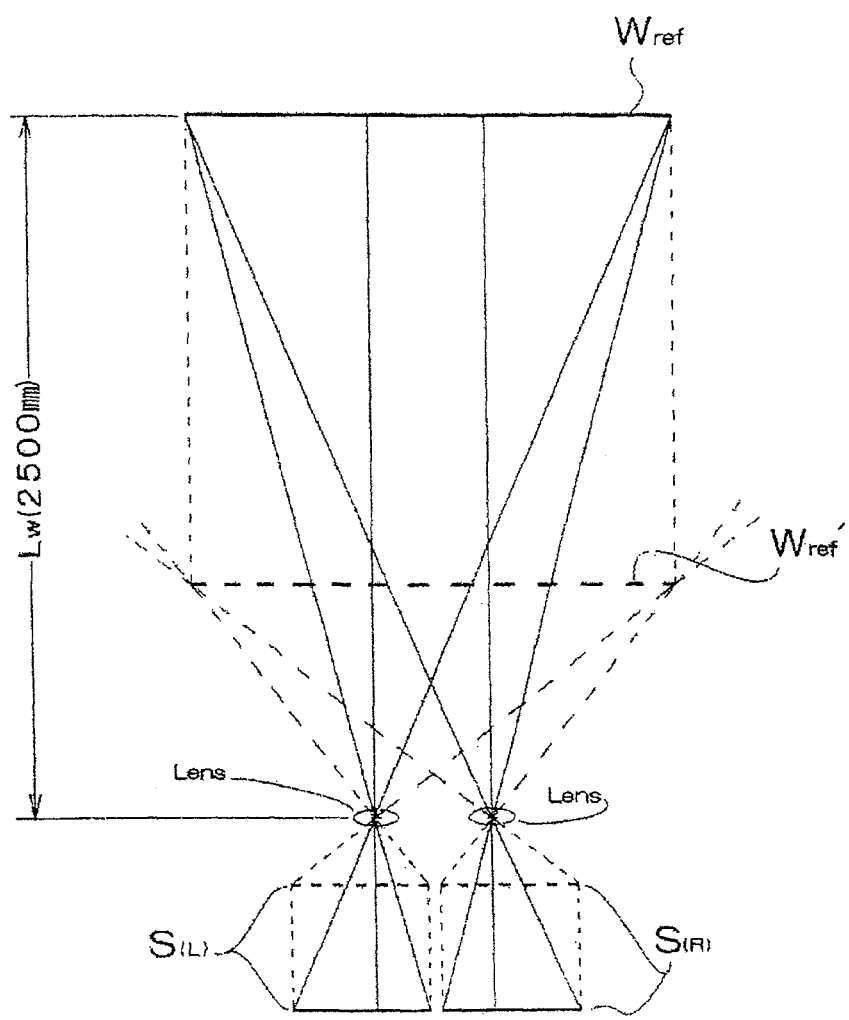
FIG. 4 is an explanatory drawing that shows a state in which a wide angle imaging lens is attached to the stereo camera of FIG. 2(b).

FIG. 4 is an explanatory drawing that shows a state in which the imaging lens in the state as shown in FIG. 2(b) is exchanged with a wide angle lens, and in order to image-capture a subject with the same width with a wide angle, the distance to an object is made smaller, and in order to form an image on the imaging elements having the same size, the focal length of the imaging lens is made shorter. As shown in FIG. 4, in the case of exchanging with an imaging lens with a short focal length, the distance at which the left and right viewfields are made coincident with each other in a stereoscopic view also becomes shorter. In the case of closely viewing an actual sight with the naked eye, if an image at infinity (an image at infinity in terms of photographing) is included in a viewfield frame $W_{ref}'$ at a position indicated by a broken line in the drawing of FIG. 4, it is impossible to simultaneously view a close-up object and a long-distance object in a stereoscopic view (in the case when a human views an actual sight, he or she views a narrow viewfield instantaneously at that time, and seems to process the image in the brain; thus, viewing these simultaneously causes fatigue in the optic nerve). However, in the case when stereoscopic image data, captured by the camera in this state (image-captured by an imaging lens having a short focal length, and left and right viewfields are made coincident with each other in a short imaging distance), is viewed by using a large-size stereoscopic television shown in FIG. 1 (stereoscopic television with a display screen in reference dimension), a desirable stereoscopic viewing state is achieved. This is because, in the case of setting the reference window $W_{ref}'$ indicated by a broken line in FIG. 4, supposing that the window actually exists, and that an actual sight is closely viewed from the window, it becomes impossible to view the left and right viewfields in a joined manner in the stereoscopic view, because a parallax between the close-up image and the long-distance image is large; however, in the case when this stereoscopic image data is viewed through each of display devices having respective setting states as shown in FIG. 1, since the reference window $W_{ref}'$ indicated by the broken line in FIG. 4 appears to be located far to the reference window $W_{ref}$ position indicated by a solid line in the drawing, a normal stereoscopic view is prepared. Therefore, the use of the wide angle imaging lens becomes advantageous, because upon capturing an image in a narrow place, the image-capturing process is carried out near a subject.

Figure 5:
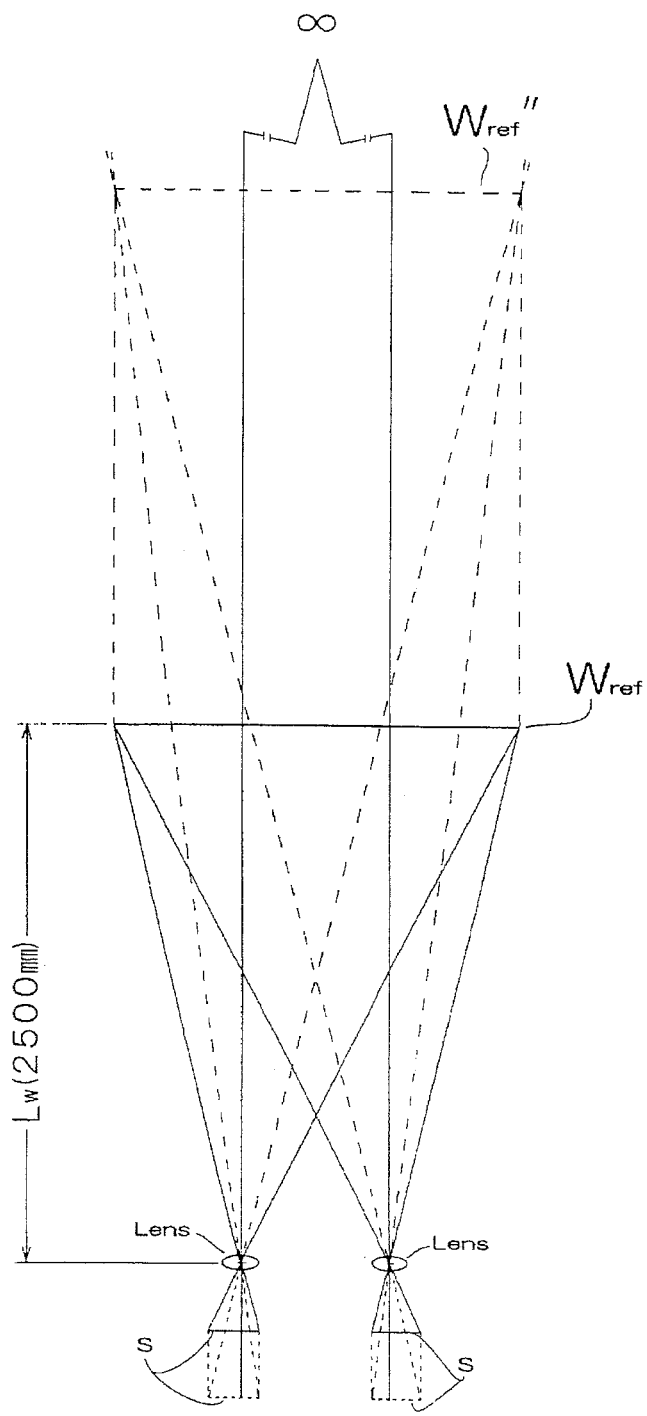
FIG. 5 is an explanatory drawing that shows a state in which a long focal length lens is attached to the stereo camera of FIG. 2(b).

In a manner reversed to that of FIG. 4, FIG. 5 exemplifies the application of a lens having a long focal length. In the case when the focal length of the imaging lens is long, the left and right imaging viewfields are made coincident with each other at a position far from the standard viewing distance (position indicated by a broken line in the drawing); however, in this case also, in the case when this data is viewed through each of display devices respectively shown in FIG. 1, since the reference window $W_{ref}''$ that is supposed to be actually located at a position indicated by a broken line appears to be located close to the viewfield frame $W_{ref}$ position indicated by a solid line in the drawing.

In accordance with the explanations using FIGS. 4 and 5, the application of a zoom lens is of course available, and even when the focal length of the imaging lens is varied to any value, the width $W_S$ and the distance $D_S$ of the imaging elements S that are fitted to calculated values from the aforementioned equations 3 and equation 4 may be used (with respect to the width of the imaging element, a slightly larger one may be used so as to set the read-out range, and the same results can be obtained). Even when the focal length of the imaging lens of a stereo camera is changed, the stereoscopic television on the viewer side may be only set to a fixed state with various conditions, for example, shown in FIG. 1. This is because light rays from the corresponding points of an image at infinity that are made incident on the left and right imaging lenses are made in parallel with each other, with distance between the optical axes of the imaging lens being set to the interpupillary distance of a human at the same time. For this reason, the distance between the corresponding points of the image at infinity projected onto the left and right imaging elements becomes equal to the interpupillary distance of a human.

In this manner, in the case when the imaging lens is exchanged, that is, for example, when a lens having a long focal length or a short focal length is used, the distance at which the viewfields are coincident with each other, that is, the set distance of "reference window", is automatically changed to be greatly deviated from the value of the distance between optical axes of 30 to 50 times greater; however, since the value 30 to 50 times greater is a basic calculated value for use indisposing the imaging elements, and is not a value to be specified by the lens to be used for capturing images, and, for example, on the assumption that a human actually views the reference window based upon the relationship (equivalent relationship) between the reference window and the reference dimension, explained by FIG. 2, the setting can be made in the same manner as in the case when viewed from the distance 30 to 50 times the interpupillary distance, and in the case when the set value of the distance between the optical axes or the focal length of the imaging lens is changed, although the position of the reference window is changed to be greatly deviated from the value of 30 to 50 times greater than the interpupillary distance, the aforementioned explanations and equations are applicable, since the actual visual effects are exerted on the viewer side.

Even in the case when the focal length of the imaging lens is changed with respect to the same stereo camera, since the width and the distance of the left and right paired imaging elements are fixed, the imaging distance at which the left and right viewfields are made coincident with each other, that is, the distance of the reference window is changed, when the focal length of the imaging lens is changed. In stereoscopic imaging, normally, in any of circumstances, it is not desirable to have an imaging state in which an object, located closer than the distance (reference window) at which the left and right viewfields are coincident, enters the imaging viewfield. For example, even in the case of providing a stereoscopic view through a finder (monitor) in a stereo camera, it is very difficult to recognize whether or not any object, located closer than the distance (reference window) at which the left and right viewfields are coincident, enters the imaging viewfield; however, by displaying a viewing reference pattern shown in FIG. 14 on each of the left and right screens of the monitor in an overlapped manner, visibility can be improved.

In a television broad-casting stereo camera, it is desirable to directly view an actual sight simultaneously as the imaging viewfield captured in a stereoscopic finder (stereoscopic monitor) is observed. As a system for realizing such a stereoscopic finder (stereoscopic monitor), for example, a liquid crystal display with a 12-inch width, as shown in FIG. 1, is attached to a stereoscopic television camera. The size of 12 inches is considered to be large as a monitor for a camera; however, a viewing position at 350 mm, as shown in the drawing, is available. In this case, left and right images are displayed alternately in a time-sharing manner. Simultaneously, a synchronizing infrared ray is transmitted from a synch signal transmitting device attached to the display (not shown). Moreover, the same left and right polarizing plates are attached to left and right stereoscopic image viewing glasses that separate the left and right viewfields. Furthermore, liquid crystal plates are attached to the front side thereof. A tilt angle sensor is attached to the glasses.

Left and right light rays alternately emitted from the LCD are the same polarized light in a constant direction. When the polarizing plates of the glasses are directed in an orthogonal direction, that is, a direction blocking the polarized light emitted from the LCD, the left and right viewfields are closed and become dark. In the state of the viewfield, the incident light from the LCD has its polarizing direction rotated by the liquid crystal plate attached to the front side of each of the glasses by 90° or 270° so that both of the left and right viewfields are brought to an opened state and changed to provide a light view. By alternately applying a voltage onto the liquid crystal plate attached to the front side of each of the glasses by infrared rays transmitted in synchronism with a display image on the LCD, the liquid crystal is brought to a tense state by the voltage so that the polarized light emitted from the LCD is maintained in the polarization direction as it is, and blocked by the polarizing plates of the glasses so that the viewfield becomes dark. Simultaneously, by alternately applying a voltage onto the liquid crystal plate of each of the glasses by infrared rays in synchronism with the LCD, the left and right viewfields are alternately opened and closed, and the left and right viewfields through which the LCD is viewed are separated so that a stereoscopic view can be provided. Moreover, when the glasses are tilted, the relative directional relationship between the LCD and the polarizing direction of the glasses is severed to cause crosstalk; however, by using the tilt angle sensor, the applied voltage is controlled and compensated so that the crosstalk is prevented. Additionally, in the electronic imaging device, its finder is not necessarily integrally formed with the camera. For example, a stereo camera composed of paired left and right imaging lenses and paired left and right imaging elements may be connected to a notebook personal computer with a USB cable or the like so that the personal computer itself is allowed to function as a finder.

Figure 11:
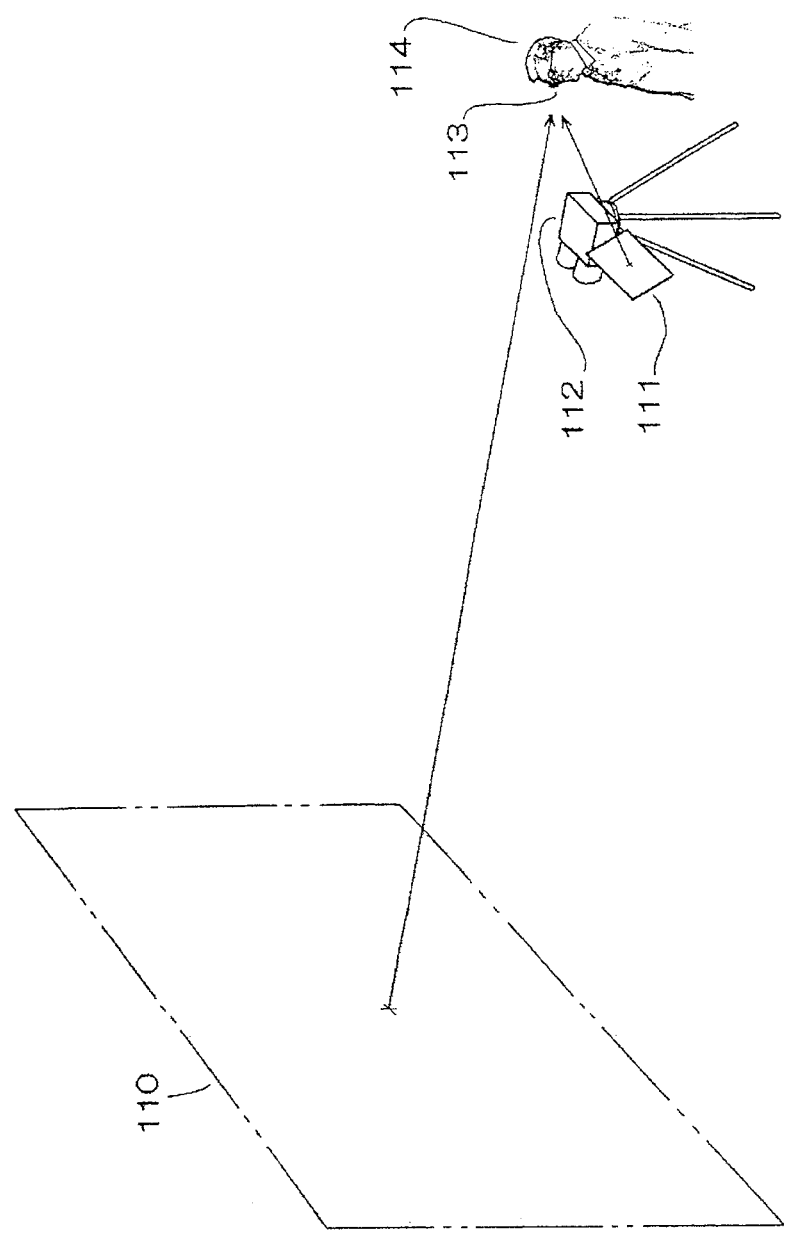
FIG. 11 shows one embodiment of a television camera provided with a stereoscopic monitor.

FIG. 11 shows a specific example of the above-mentioned stereoscopic television camera, and a two-dot chain line 110 shown in the drawing represents the reference window explained in the above description. This reference window is substantially prepared as a viewfield of the camera, which corresponds to a viewfield frame that is virtually set on an actual view to be image-captured by the stereo camera. This virtual viewfield frame forms a state similar to the state in which, for example, the outside sight is viewed through a window or the like of a house. However, since no frame exists in the actual sight, a camera man 114 directly views not only the imaging viewfield (reference window 110 in the drawing), but also the sight outside the imaging viewfield, through the stereoscopic image viewing glasses 113 via the stereoscopic television camera 112. Upon viewing the monitor 111 located below a stereoscopic image that gives the same size and the same distance feeling (appears to be such a state, although actual display dimension is different) as those of the reference window 110 is viewed on the monitor 111 (inside thereof).

In the relationship between the width of the display and an appropriate viewing distance of the monitor 111 of FIG. 11, supposing that $L_1=350$ mm in FIG. 3, $W_{P1}$ of each of the left and right display screen widths, shown in the drawing, is represented by $W_{P1}=W_{P0} \times L_1/L_0$, and supposing that $W_{P0}=1800$ mm and $L_0=2500$ mm, $W_{P1}$ of each of the left and right display screen widths becomes $W_{P1}=1800 \times 350/2500=252$ mm. The distance between the left and right screens, that is, the picture distance, which is indicated by $D_{P1}$ of FIG. 3, is displayed as $D_{P1}=65(350/2500)=55.9$, supposing that the interpupillary distance is represented by B=65 mm in $D_{P1}=B(1-L_1/L_0)$ in the aforementioned formula 2, and the distance between the centers of the right and left image display screens, that is, the picture distance, is displayed with the distance explained in the description relating to the equation 2, with the distance of the corresponding points of an image at infinity is displayed as 65 mm that is equal to the interpupillary distance of a human. In FIG. 3, $D_{P1}$ (R) represents the right side screen and $D_{P1}$ (L) represents the left side screen. At this time, the size (total width) of the display $D_1$ is the sum of $W_{P1}$ and $D_{P1}$, that is, $W_{P1}+D_{P1}=252+55.9=307.9$ mm, and this dimension is slightly larger than 12 inches, that is, 12×25.4=304.8 mm; however, this value is derived from the notation obtained by processing the viewing distance based upon numeric values for every 10 mm intervals, and in actual viewing distance, no problems are raised even when viewed from a slightly long distance.

When the viewing distance $L_1$ is calculated from the display size in a reversed manner, in FIG. 3, $L_1$ is represented by: $L_1=L_0(W_{P1}+D_{P1}-B)/(W_{P0}-B)$, and supposing that $W_{P1}+D_{P1}=12''=304.8$ mm, B=65 mm, $W_{P0}=1800$ mm and $L_0=2500$ mm, the viewing distance $L_1$ is given as $L_1=2500 (304.8-65)/(1800-65)=345.53$ mm.

Figure 14:
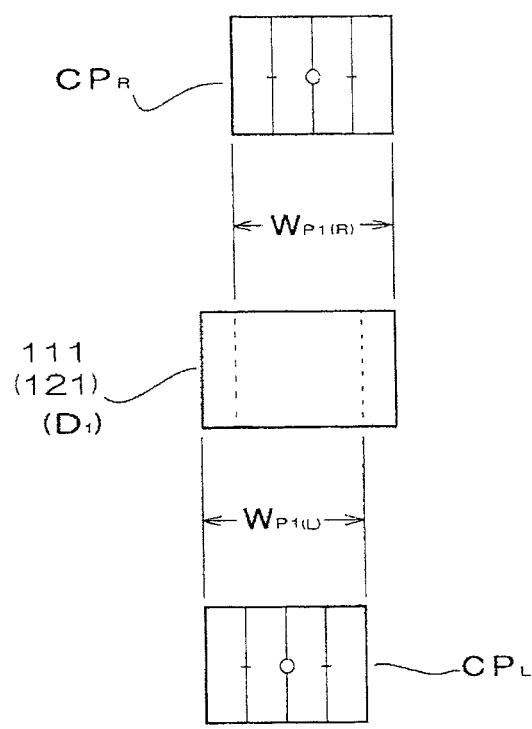
FIG. 14 is a drawing that shows one example of patterns to be displayed on the stereoscopic monitors of FIGS. 11 and 12.

Moreover, in order to provide good visibility of a stereoscopic view of the monitor of the stereoscopic television camera, a viewing reference pattern mainly composed of longitudinal lines is displayed on each of the left and right images in an overlapped manner by using software. FIG. 14 is a specific view of the monitor 111 of the stereoscopic television camera 112 of FIG. 11, and on the monitor 111 (display $D_1$), viewing reference patterns CP are displayed at such positions as to be respectively overlapped with left and right images. Of course, the viewing reference patterns are displayed only on the finder, and image data to be sent from the stereo camera is limited only to captured image data.

When the liquid crystal monitor 111 of the stereoscopic television camera 112 described above is stereoscopically viewed through the stereoscopic image viewing glasses 113, the adjustment state of a stereoscopic feeling can be visually recognized. Thus, the stereoscopic image viewed through the monitor of this stereoscopic television camera gives the completely same stereoscopic feeling as that given to a viewer who is watching a stereoscopic television that receives a stereoscopic broadcast image-captured by this stereoscopic television camera and sent thereto.

Moreover, regardless of monaural images or stereo images, when dynamic images are captured, it is important to notice the proceedings of the event simultaneously with the image capturing process. Therefore, the television camera with this arrangement that allows the operator to always view the actual sight together with the monitor exerts great functions and effects.

Example 2

The characteristic of example 2 of the present invention lies in that, even in the case when the subject range is greatly varied depending on imaging subjects (sights), only by adjusting the distance between left and right paired imaging units that are attached onto a guide way in parallel with each other, stereoscopic image data can be obtained while an insufficient stereoscopic feeling can be compensated for in a long distance imaging process and while a joined state of left and right images is always kept in an optimal state in a short distance imaging process.

The invention described in [Example 1] is a basic structure of the present invention, which allows a human to have the same feeling as that which is obtained when a human views an actual sight before his or her eyes. In the case of viewing a normal stereo slide/print or an electronic stereoscopic stationary image, a stereo camera of this type is sufficiently used; however, in the case of a movie, TV or the like, images that a human would not feel in the actual life are used in many cases. For example, even when a human actually views a person riding on a horse far in the distance in the wilderness, the person and horse are seen as very small figures like beans and it cannot be actually distinguished what kind of a person is going in which direction; however, in a movie, TV, or the like (conventional monaural image), in the case of such a scene, a technique has been used in many cases, in which a close-up image of the subject like an image viewed through a binocular is given. In such a long distance image, even in the case of viewing through a binocular, since left and right parallaxes are small (insufficient distance between the optical axes), the actual image is viewed as if it was a 2-D image (plane image); however, in the stereoscopic TV or the like, a vital substantial stereoscopic feeling is demanded even in the close-up imaging.

In view of the above demand, a stereo camera (hyper stereo camera) has been proposed, in which the left and right imaging units are separated from each other so that the distance between optical axes is expanded to be greater than the interpupillary distance of a human; however, problems with how to capture images projected by the two left and right greatly spaced lenses and how to display the left and right images as a joined view (stereoscopic view) have not yet been solved.

Contrary to the hyper stereo camera, in the case of imaging a subject in the close distance, parallaxes tend to become excessive even in the distance between optical axes that is equal to the interpupillary distance of a human, resulting in a difficulty in providing a joined view of left and right images in a stereoscopic view. For use in such close-distance imaging, a micro-stereo camera has been known in which the distance between optical axes in imaging lenses is set to a distance narrower than the interpupillary distance of a human; however, problems with how to provide a joined view of the left and right images have not yet been fully solved in the micro-stereo camera as well.

Figure 6:
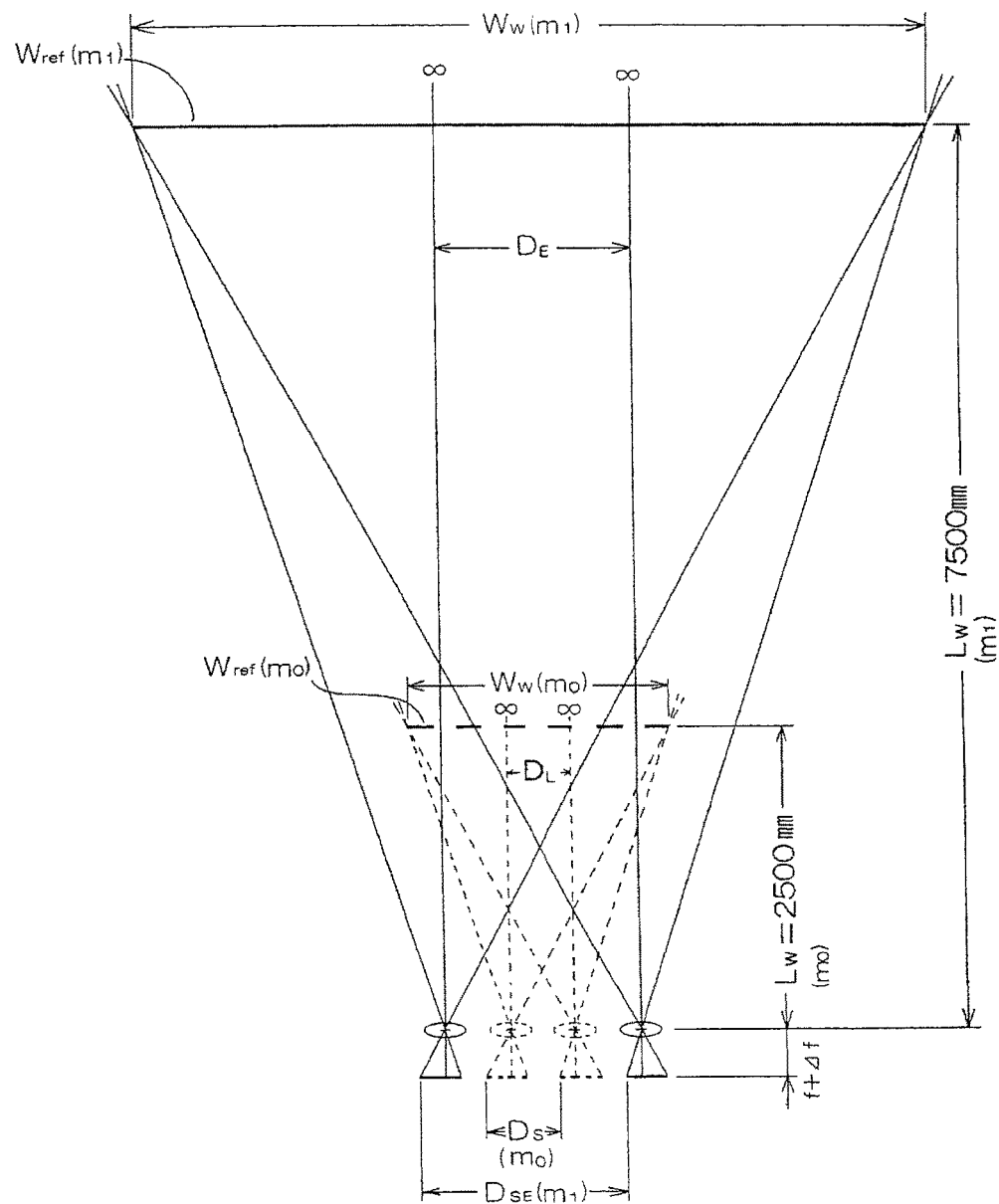
FIG. 6 is an explanatory drawing that shows a mode (mode 1) in which the distance between optical axes of the stereoscopic imaging device is set to a dimension larger than the interpupillary distance of a human.

In FIG. 6, the explanation given by a solid line shows one example of a stereoscopic imaging device disclosed in Claim 4 of the present invention, and that given by a broken line shows the device based upon the same conditions as those of FIG. 2(b) of the present application in which the distance between optical axes $D_L$ is set to a distance equal to the interpupillary distance B of a human, that is, $D_L=B$, and for convenience of explanation, this state is referred to as a mode 0 (indicated by symbol $m_0$ in the drawing). In FIG. 2(b), in the reference window positioned on the extended center line of the camera, the left and right distance of the projected images $I_{ref}$ by the two imaging lenses disposed with a distance $D_L$ equal to the interpupillary distance B becomes greater than the distance between optical axes $D_L$ of the left and right imaging lenses. Supposing that the set distance of the reference window $W_{ref}$ is $L_W$, the distance between optical axes of the left and right imaging lenses is $D_L$, the focal length of the imaging lens is f and the focus adjusting amount is $\Delta f$, the distance between the left and right projected images $I_{ref}$ (equal to the distance $D_S$ between imaging elements) is calculated by the aforementioned equation [equation 4], that is, $D_S=D_L(1+(f+\Delta f)/L_W)$. In this case, since the stereoscopic image is captured in a pan-focus state, $f+\Delta f \approx f$ may be set in the above equation.

In accordance with the above equation, the distance $D_S$ between imaging elements in the mode 0 of the imaging device indicated by the broken line in FIG. 6 is determined by the distance $D_L$ between optical axes and a projection ratio $f/L_W$ of the reference window. That is, the distance $D_S$ between imaging elements is increased by the amount of $D_L \times f/L_W$ ($L_W$ in the equation is a value in the state of the mode 0) in comparison with the distance $D_L$ between optical axes. Moreover, the distance $D_{SE}$ between imaging elements under conditions of the mode 1 of the imaging device indicated by the solid line in FIG. 6 is calculated by the dimension of $D_{SE} = D_L(D_E/D_L) + D_L \times f/L_W$ ($L_W$ in the equation is a value in the state of the mode 0) because the distance $D_{SE}$ thereof is simply parallel-shifted over the entire imaging unit.

With an offset value of the imaging elements relative to the optical axes of the left and right imaging units of the stereoscopic imaging device in the display mode 0 indicated by the broken line being kept as it is, the state (indicated by $D_E$ in the drawing) in which the distance between optical axes of the left and right mutual imaging units is expanded beyond the interpupillary distance of a human is referred to as a mode 1 (indicated by symbol $m_1$ in the drawing), and this state is indicated by the solid line. In the example shown in the drawing, the distance $D_E$ between optical axes expanded in the mode 1 is indicated as 3 times the distance $D_L$ between optical axes in the mode 0, that is, $D_E = 3D_L$. Theoretically, this value is not limited to 3 times, and even if it is 10 times or 10 times or more, no problems are raised; however, for convenience of plotting on the paper, that of 3 times is exemplified.

The imaging unit of the mode 1 indicated by the solid line is formed by parallel-shifting the unit of the mode 0 indicated by the broken line, with the offset value of the imaging elements described above being kept as it is, so as to expand the distance between optical axes up to $D_E$ indicated in the drawing. Even in the case when the distance between optical axes is expanded, since the offset value of the imaging elements relative to the imaging lens is not changed, the angle between lines connecting the main point of the imaging lens and the two ends of the imaging elements is not changed so that each of the broken lines of the mode 0 and each of the solid lines of the mode 1 are made in parallel with each other. Therefore, as shown in the drawing, in the mode 1, the width $W_W(m_1)$ of the reference window $W_{ref}(m_1)$ and the distance $L_W(m_1)$ are automatically generated, and increased in proportion to those of the mode 0.

In the case when a stereoscopic image captured in the state of the mode 1 is displayed on the large-size stereoscopic TV with a display screen in reference dimension, shown in FIG. 1, the width $W_S$ of the imaging elements of FIG. 2(b) is displayed with a width of $W_D$ on the display D in FIG. 2(a). Therefore, although the width $W_W(m_1)$ of the reference window $W_{ref}(m_1)$ of the mode 1 is expanded by a multiple $D_E/D_L$ (3 times in the example shown in FIG. 6) of the distance between optical axes relative to that in the mode 0, it is viewed on the display screen as a width being returned to the width of the mode 0, and in this case, the position of the reference window $W_{ref}$ is also viewed as the position (large-size stereoscopic television of FIG. 1) of the mode 0. Moreover, since the distance between optical axes is expanded (3 times in the example of the drawing), the corresponding points of a subject at infinity are image-captured with the proportional distance (3 times), and always displayed in the state shown in FIG. 1 on the display side so that the corresponding points of an image at infinity are displayed with the interpupillary distance of a human regardless of the distance between optical axes on the image-capturing side. Therefore, even in the case when the distance between the imaging units is changed from the state of the mode 0 to the state of the mode 1, since the observer always views images at infinity in parallel with each other, a subject at infinity is viewed as located at infinity, while in the case of a close-distance image, the position $L_W(m_1)$ of the reference window $W_{ref}(m_1)$ of the mode 1 is viewed at the position $L_W(m_0)$ of the reference window of the mode 0; therefore, since a close-range (comparatively) subject is viewed as located more closely (in the example shown in the drawing, 7.5 meters ($m_1$) is viewed as 2.5 meters ($m_0$)) so that since the subject is displayed in the same manner as in the case of having a large relative distance between the perspective far and near points of the subject, the perspective far or near distance feeling is emphasized, but no problems are raised in a stereoscopic view, making it possible to easily provide a joined view of the left and right images.

Moreover, contrary to the above hyper stereo camera, even in the case of the distance between the optical axes set in the interpupillary distance of a human, the distance between the optical axes becomes excessive relative to a subject in a very close distance. This causes a serious problem in the case when an attempt is made to image-capture a subject within a very close distance. This is because in the case of a close-range image capturing with a very short distance to the object, the left and right lenses capture images of completely different portions of the subject. In such a case, it becomes impossible to provide a joined view of the left and right images in a stereoscopic view. In particular, this problem is more seriously raised in the case of a stereoscopic endoscope.

Figure 7:
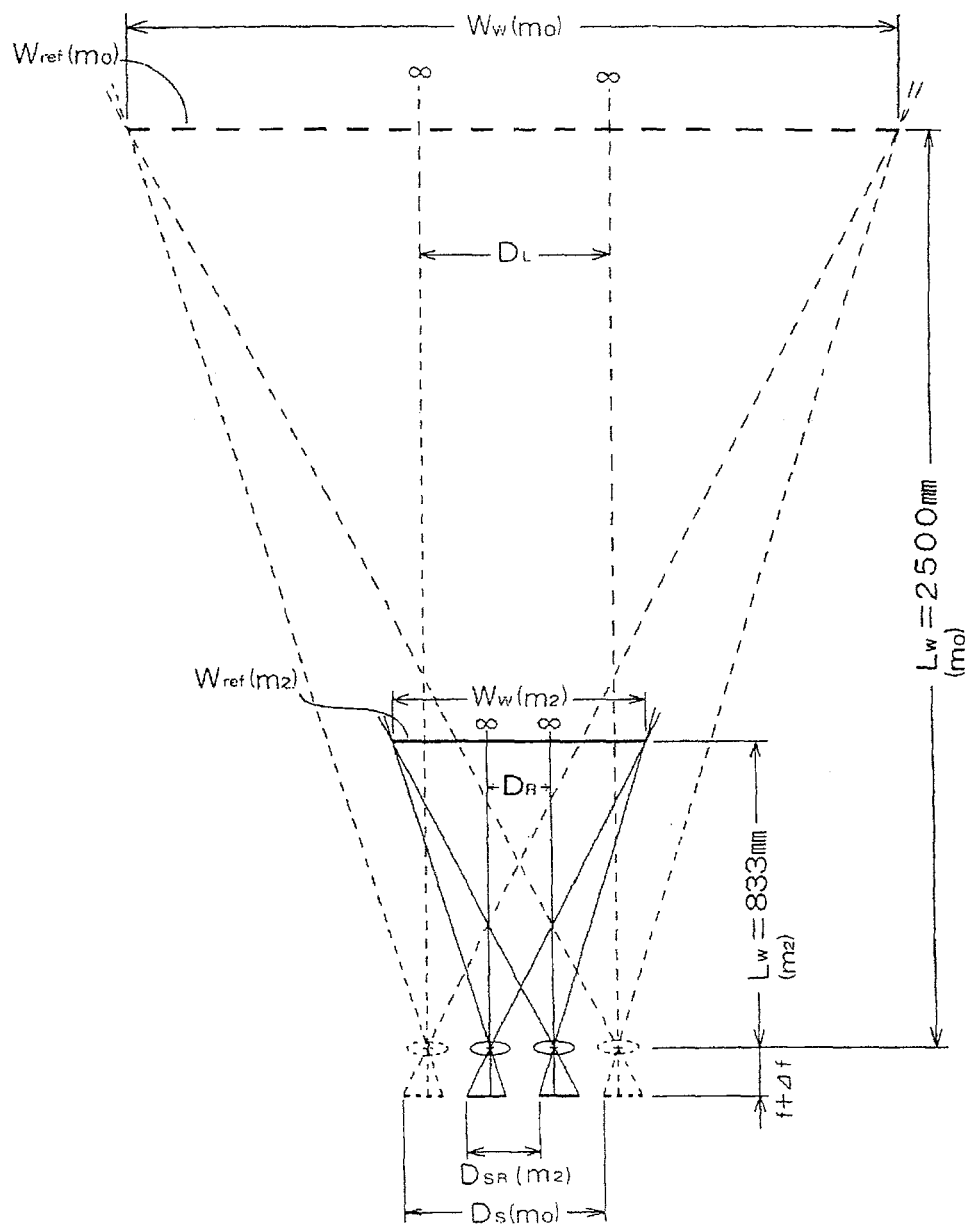
FIG. 7 is an explanatory drawing that shows a mode (mode 2) in which the distance between optical axes of the stereoscopic imaging device is set to a dimension smaller than the interpupillary distance of a human.

In view of the above problem, in the example disclosed in Claim 5 of the present invention, as shown in FIG. 7, the state indicated by the broken line is a state in the mode 0, and the distance $D_L$ between optical axes in the mode 0 is made closer to the distance between the imaging units so that the distance between optical axes is reduced to $D_R$ shown in the drawing; thus, this state indicated by a solid line is referred to as a mode 2. In the example shown in the drawing, in the mode 2, the distance between optical axes $D_R$ is displayed with a relationship of ⅓ of the distance between optical axes $D_L$ in the mode 0, that is, $D_R = D_L/3$. In this case also, in the same manner (opposite manner to) as in the expanded mode 1, all the portions are reduced in proportion to one another, and the reference window is automatically generated at the position ($L_W(m_2)$ shown in the drawing) indicated by a solid line in the drawing. Then, in the same manner as in the mode 1, by projecting images captured by the imaging elements to the large-size stereoscopic television (display screen in reference dimension) shown in FIG. 1, the reference window $W_{ref}(m_2)$ of the mode 2 indicated by a solid line in FIG. 5 is viewed at the position of the reference window $W_{ref}(m_0)$ of the mode 0 indicated by the broken line with the corresponding size.

Figure 8:
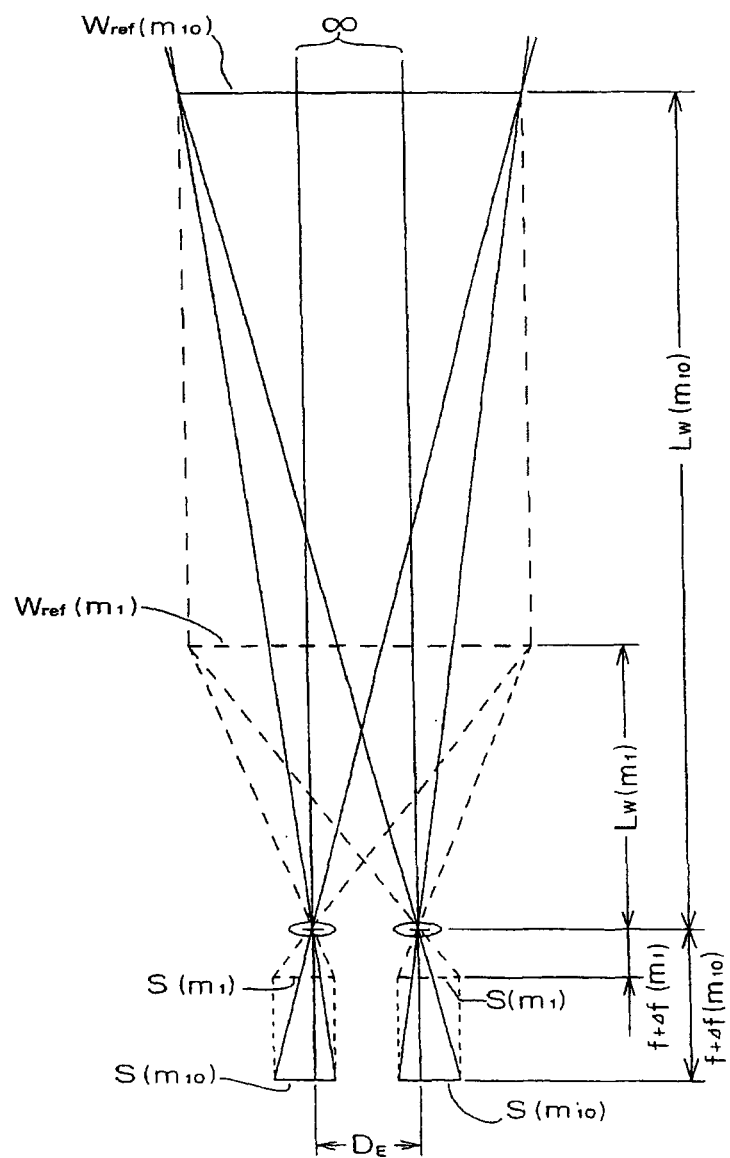
FIG. 8 is an explanatory drawing that shows a mode (mode 10) in which the distance between optical axes of the stereoscopic imaging device is set to a dimension larger than the interpupillary distance of a human (FIG. 6) and a long focal length imaging lens (telescopic lens) is further attached thereto.

The above description relates to an attempt to emphasize the stereoscopic feeling (perspective far and near feeling) (FIG. 6) by expanding the distance between optical axes in the long distance imaging or an attempt to easily join the left and right viewfields by reducing the distance between optical axes (FIG. 7) in the close distance imaging, and in the drawing of FIG. 6, supposing that by placing objects having the same size are placed at the position of the reference window $W_{ref}(m_1)$ of the mode 1 and the position of the reference window $W_{ref}(m_0)$ of the mode 0, images thereof are captured, the object placed at the position of the reference window $W_{ref}(m_1)$ of the mode 1 forms a projected image on the imaging elements having a size of ⅓ in comparison with that of the mode 0 so that although the perspective far and near feeling is emphasized, the shortest distance capable of imaging, that is, the distance to the reference window $W_{ref}(m_1)$ becomes longer, and in some cases, the shape (for example, the face of a human or the like) becomes unrecognizable. However, this provides another application. That is, for example, this includes a case where a sight of a large city or the like is image-captured from the sky above, and in this case, an attempt is made to include a certain range (width of sights) into the viewfield. On the contrary, there is another demand for obtaining an enlarged view of a long distance object. In such a case, the focal length of the imaging lens may be simply extended (exchanging the imaging lenses or obtaining a zooming-up function by using a zoom lens), and as shown in FIG. 8, in the case when the focal length of the imaging lens is extended in the mode 1, the reference window $W_{ref}(m_1)$ of the mode 1 is generated at a position of $W_{ref}(m_{10})$ as shown in the drawing, and at the time of viewing, the reference window $W_{ref}(m_{10})$ is viewed at the position of the reference window $W_{ref}(m_0)$ in the mode 0. In this case, since the window located at a long distance is brought closer with the same size, the subject image is also viewed in an enlarged manner together with a perspective far and near feeling. In the case when the distance between optical axes of the imaging lenses is extended as described above, with the focal length of each of the imaging lenses being also altered, the resulting distance of the generated reference window is represented by the magnification of the distance between optical axes×the magnification of the imaging lens, and as shown by an example in FIG. 8, in the case when to a stereoscopic imaging device, with the distance between optical axes being extended by 3 times the interpupillary distance, an imaging lens having the focal length of 3 times larger than that of the mode 0 is attached, the resulting reference window $W_{ref}(m_{10})$ is generated at a distance 9 times longer (2.5×9=22.5 meters).

Additionally, as explained in the drawings of FIGS. 6 and 8, even when the distance between optical axes is increased or even when the focal length of the imaging lens is extended, the set distance of the generated distance of the "reference window" is increased in proportion to the corresponding distance. For this reason, even if an imaging lens having a long focal length is used, an image-capturing process needs to be carried out from a corresponding longer-distance position, failing to obtain an image with a sufficient size in some cases. Therefore, in accordance with the purposes for imaging, in the case of emphasizing the stereoscopic feeling, an image-capturing process is carried out with the distance between optical axes being increased, or in the case of requiring an enlarged image, an image-capturing process is carried out, with the focal length of the imaging lens being preferentially extended (exchanging to an imaging lens with a longer focal length or adjusting a zooming ratio), without increasing the distance between optical axes so much.

Figure 9:
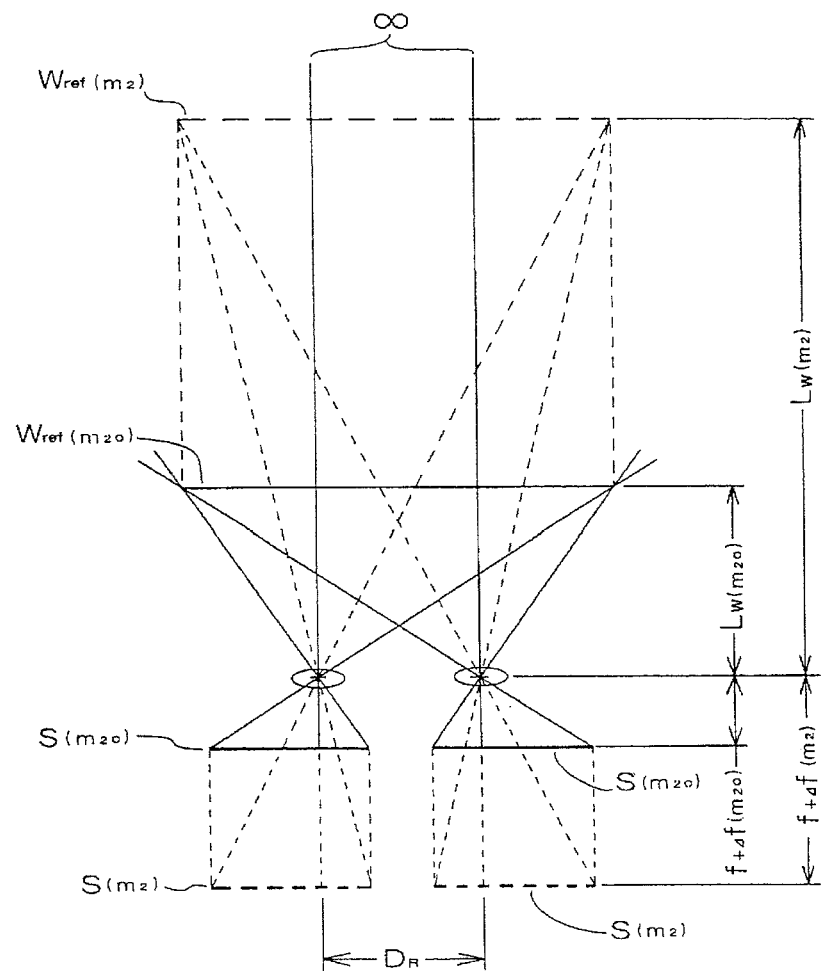
FIG. 9 is an explanatory drawing that shows a mode (mode 20) in which the distance between optical axes of the stereoscopic imaging device is set to a dimension smaller than the interpupillary distance of a human (FIG. 7) and a short focal length imaging lens (wide angle lens) is further attached thereto.

On the contrary to the above-mentioned case, FIG. 9 explains a case where even in the case of the imaging device in the mode 2 of FIG. 7 for imaging an object in a very close distance, an image-capturing process is sometimes carried out with a further closer distance. This is because, in some cases, it is physically not possible to have a large distance to the subject (for example, an endoscope is a typical example), and in such a case, by exchanging the imaging lens having the focal length set in the mode 2 as shown in the drawing with one having a shorter focal length, the closer distance to the object to be image-captured is available. In this case also, the generated position of a reference window $W_{ref}(m_{20})$ shown in FIG. 9 is determined by multiplying the magnification of the distance between optical axes by the magnification of the focal length, and for example, by setting the distance between optical axes $D_R$ to a ⅓ of the interpupillary distance in FIG. 9, with the imaging lens being exchanged with one having a focal length f of a ⅓ of the lens in the mode 0, the reference window $W_{ref}(m_2)$ of the mode 2 shown in FIG. 7 is generated at the position of the reference window $W_{ref}(m_{20})$ of the mode 2 shown in FIG. 9, and in this case, the distance of the reference window is generated at a ⅑ of the distance (2.5×⅑=0.278 meters). Upon viewing the reference window $W_{ref}(m_{20})$ generated at a position of $L_W(m_{20})$ shown in FIG. 9, it is viewed as located at the position of the reference window $W_{ref}(m_0)$. In this case, since the window located at a very close distance is viewed with the same size by returning it to the position of the reference window of the mode 0, a natural perspective far and near feeling is obtained in a stereoscopic view, and no difficulty is caused in a joined view.

In the case of a stereoscopic endoscope or the like, its imaging distance becomes an extremely close distance so as to observe inner walls of the intestine or the like, and since the device itself needs to have an ultra-small size, the distance between optical axes needs to be inevitably set to an extremely short distance. For this reason, with respect to the bore diameter and the focal length of each of the left and right imaging lenses, those having very small sizes are demanded. Accordingly, with respect to the imaging elements, those having very small sizes are demanded. In the case when the distance between units is made extremely small, the left and right imaging elements tend to interfere with each other (collide with each other); therefore, the left and right units are preferably formed into an integral structure. Moreover, in such a case, the focal length f of the imaging lens of FIG. 2(*b*) is preferably made to have an extremely small size (in the mode 0). In the case when the viewing angle α shown in FIG. 2(*b*) is made constant, the width $W_S$ of each imaging element can also be made smaller, in the case of shortening the focal length of the imaging lens, so that the entire device can be miniaturized.

With this arrangement, in the case when the distance between optical axes is further reduced to, for example, a ¹⁄₁₀, with the focal length of the imaging lens being reduced to a ¹⁄₁₀, the distance $L_W$=2500 mm of the reference window in the mode 0 is reduced to a ¹⁄₁₀₀ in the mode 2, and set to the position of $L_W$=2500/200=25 mm. As described above, the contents of claim 5 of the present invention can be applied to an ultra-small stereoscopic camera, such as a stereoscopic endoscope.

As described earlier, the concept of the present invention is adapted for a wide range of imaging, from long-distance imaging to close-up imaging, as a stereoscopic imaging device, and in recent TV cameras (monaural), zoom lenses are more often used rather than the system in which imaging lenses are exchanged. This is mainly because, upon capturing dynamic images, no images can be captured during a period for exchanging lenses, and because a technique for continuously zooming up during imaging is often used, and there are the same demands for the stereoscopic imaging device. As explained in the stereoscopic imaging device of the mode 1 in which the distance between optical axes is extended, and in the stereoscopic imaging device of the mode 2 in which the distance between optical axes is reduced, even when, by altering the distance between the left and right imaging units, the distance between optical axes is changed to any distance, no position (offset value) alternation of the imaging elements relative to the optical axes of the imaging lenses is required; therefore, the above demands are satisfied by the steps of setting left and right imaging units to which zoom lenses are attached onto a guide way, driving the distance between the left and right imaging units by a servomotor, detecting the magnification of the zoom lens by using a position detector, such as a potentiometer, an encoder, etc., and determining the drive position of the servomotor based upon the detected values; thus, the distance of the left and right units can be automatically set by simply adjusting the magnification of the zoom lens (claim 6).

In this case, the set value of the distance between optical axes relative to a zooming ratio (ratio of set values of focal lengths) may be determined in one method as a value that is proportional to the zooming ratio relative to the distance between optical axes $D_L$ in the mode 0 state; however, this set value should not be limited, and the zooming ratio and the distance between optical axes may be adjusted separately without providing cooperative movements (switching between automatic/manual operations).

Figure 10:
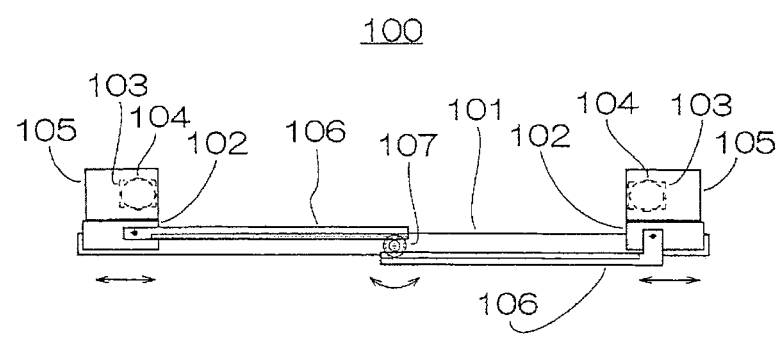
FIG. 10 shows one example of the stereoscopic imaging device of the present invention.

FIG. 10 is a structural drawing that shows mode 1, mode 2, mode 10 and mode 20 of the stereoscopic imaging device of the present invention. In an imaging device 100, left and right two sliders 102 which have left and right imaging units 105 mounted thereon are attached onto a guideway 101 so as to slide 102 thereon in an engaged state. Racks 106 are respectively coupled to left and right sliders 102, and the left and right racks are engaged with pinion gears 107 attached to a center portion in a symmetric manner. Therefore, by rotating the pinion gears 107 manually or by using a servomotor, the left and right imaging units 105 are moved on the guide way in an opposed manner to each other, with their mutually parallel orientations being maintained and with the distance between them being freely adjusted.

Although no problems are raised in the case of the mode 1 and the mode 10 in which the left and right imaging units are extended, it becomes difficult to set the distance between optical axes to a small value because of mechanical interference between the left and right imaging units in the case of the mode 2 and the mode 20 in which the distance between optical axes is reduced. Therefore, as shown in FIG. 10, by providing a structure in which each of the imaging lenses is biased relative to each of the outer case of the imaging units, a comparatively advantageous arrangement is achieved in the case of reducing the distance between optical axes. However, since forming left and right individually different units causes a difficulty in production, fixing surfaces of the imaging units 105 that are made in contact with the slider 102 shown in the drawing may be formed at up and down symmetric positions of the imaging units, and upon attaching, these may be inversely rotated by 180° and used. A problem raised in this case is that the up and down sides of the imaging elements are also reversed. It seems that even when the digital camera is rotated centered on the optical axis, the monitor image is not rotated (always displayed in an upright image state); however, this is because the monitor itself is rotated centered on the optical axis of the imaging lens, and since image data to be externally sent is influenced by the camera orientation, this point needs to be taken into consideration; moreover, switching by 180° seems to be carried out by an inverting process only on the output side; however, since the reading direction is also inverted in a symmetric manner longitudinally as well as laterally, no simultaneous property is obtained in the left and right images, failing to be used. For this reason, switching needs to be made, with the left and right units being attached, so as to set the reading directions of the left and right imaging elements laterally in parallel with each other.

As described earlier, zoom lenses may be respectively attached to the left and right imaging units of a stereoscopic imaging device so that left and right units are adjusted in cooperation with each other in accordance with adjustments of the zooming ratio; however, the zoom lens inevitably has a large external shape in comparison with the single focal point lens. For this reason, in some cases, the left and right imaging lenses tend to mutually collide with each other, failing to reduce the distance between optical axes to a required value. Consequently, it is sometimes better to prepare another stereo camera exclusively used for micro-image capturing, to which a lens having a small external shape for use only in close-up imaging is attached.

Even when the distance between the left and right imaging units is freely adjusted, only the stereoscopic feeling is changed at the time of viewing, and no problems of causing double images of the left and right image frames and of failing to provide a joined view of long-distance and close-distance images are raised. However, there is another problem in that upon capturing a stereoscopic image in any of cases, no subject should be image-captured before the reference window $W_{ref}$. In the mode 1 state, the distance $L_W(m_1)$ of the reference window $W_{ref}(m_1)$ is greatly changed in response to the adjustment of the distance between optical axes. Moreover, in the mode 2, the absolute value, itself, of the amount of change in the generated distance of the reference window becomes a value smaller than that in the mode 1 state; however, the amount of change in the value in such a close distance as in the mode 2 is not so small. Consequently, in the case of a method in which the set distance of the reference window is estimated at the time of capturing an image and the subject distance is visually measured or the like based upon the set value so as to capture an image, a problem is raised in that no estimation is available. This problem can be solved by an arrangement in which, as shown in FIG. 11, the left and right same viewing reverence patterns $CP_R$ and $CP_L$, each mainly composed of longitudinal lines, are displayed on the left and right same positions on the left and right sides of a display screen of a stereoscopic view finder (monitor) 111 by using software in a manner so as to be overlapped with left and right images so that the patterns can always be viewed on the positions of the reference windows even when the distance between optical axes of the imaging device is adjusted to any distance, thereby making it possible to obtain a distance feeling at the time of capturing an image.

Moreover, as described earlier, the stereoscopic image should be captured in a pan-focus state so as to clearly view all the long-distance and close-up subjects, and when the diaphragm is narrowed to a small bore diameter so as to form the pan-focus state, the quantity of light becomes insufficient. In particular, in the case of dynamic images, since the time of exposure per sheet of image is limited to a fixed period, a dark environment causes a disadvantage. The same is true for a subject having fast movements. In the stereoscopic imaging device of the present invention, an image-capturing process needs to be carried out, with a subject being always viewed beyond the reference window so as to be located on the other side. This is advantageous from the viewpoint of focal point adjustments. The reason for this is because the focal point can always be adjusted to be located on the other side of the reference window.

In the structure (mode 0) shown in FIG. 2(b), when it is supposed that the width $W_W$ of the reference window $W_{ref}$ is set to 1800 mm and the focal length of the imaging lens is f=25 mm, since the focal length f becomes a 1/100 of 2500 mm, that is, the distance ($L_W$ in the drawing) from the main point of the imaging lens to the reference window, the image is reduced to a 1/100 and projected. Therefore, the reference window width $W_W$=1800 is reduced to a 1/100 on the imaging elements, and projected with a reduced width of 18 mm. However, since the distance from the main point of the imaging lens to the surface of each imaging element becomes longer by an amount of Δf caused by the focal point adjustment, as shown in the drawing. Upon examination on the value Δf, in an equation of $\Delta f = f^2/(L_W-f) = 25^2/(2500-25) = 0.2525 \approx 0.25$ mm, an actual projection ratio is given as: $(\Delta f+f)/L_W=(0.25+25)/2500=1/99$; however, this value is negligible.

Next, in the state of the mode 10, for example, by using a zoom lens, when the focal length of an imaging lens is set to f=25×5=125 mm, that is, 5 times the above-mentioned f=25 mm, with the distance between optical axes being cooperatively extended to 5 times, the set distance $L_W(m_{10})$ of the reference window is given as $L_W(m_{10})$=2500×5×5=62500 mm (62.5 meters). In this case, the focal point adjusted amount Δf, with the focal point being adjusted to the reference window, is represented by:

$$\Delta f = f^2/(L_W-f) = 125^2/(62500-125) = 0.25050 \approx 25 \text{ mm.}$$

On the contrary to the above-mentioned mode 10, for example, upon calculations in the mode 20 in which the distance between optical axes is reduced to a value smaller than the interpupillary distance, when the focal length of an imaging lens is set to f=25/5=5 mm, that is, a 1/5 of the value in the mode 0, with the distance between optical axes being set to a 1/5 thereof, the set distance $L_W(m_{20})$ of the reference window is given as $L_W(m_{20})$=2500/25=100 mm, that is, a distance of $(1/5)^2=1/25$, and in this case, when the focal point is adjusted to the reference window, the focal point adjusted amount Δf is represented by:

$$\Delta f = f^2/(L_W-f) = 5^2/(100-5) = 0.2632 \approx 0.26 \text{ mm.}$$

In this manner, although the amount of Δf increases on the mode 20 side, the difference is an extremely small amount. Moreover, since the value of about 0.25 mm is included within the depth of focus of the imaging lens, Δf=0 may be set, and for example, in an attempt to strictly adjust the focal point at the position of the reference window, the imaging lens may be advanced (in the subject direction) by 0.25 mm from the f value, and fixed thereto. Therefore, in the case when by attaching a zoom lens, the focal length and the distance between optical axes are cooperatively brought into a state where each of them has an equal size to that in the mode 0, the best method is to lock the Δf value derived from the focal point adjustment of the lens within a value from 0 to 0.25 mm, that is, in a fixed focus state.

Figure 12:
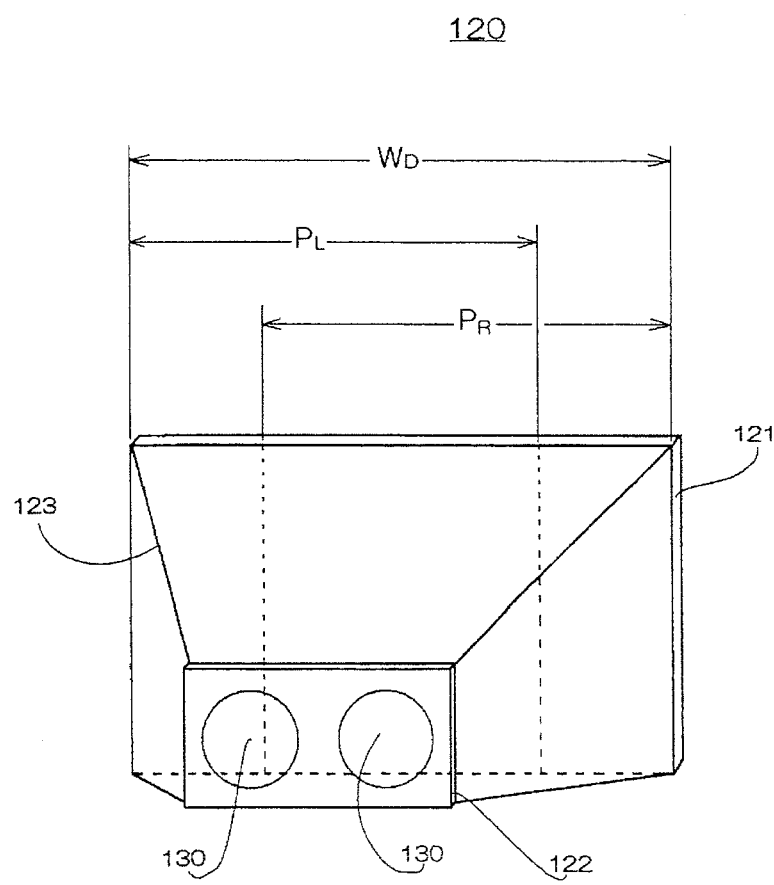
FIG. 12 shows another embodiment of the stereoscopic monitor.

FIG. 12 shows another embodiment of the stereoscopic monitor of the present invention, and a stereoscopic monitor 120 of FIG. 12 can be installed in the stereoscopic imaging device 100 shown in FIG. 10, or can be separately installed and coupled thereto with a wire, or through radio communication. As shown in FIG. 12, on a display 121 of the stereoscopic monitor 120, left and right viewing reverence patterns $CP_R$ and $CP_L$, shown in FIG. 14, are displayed on the respective left and right images by using software in a manner so as to be overlapped therewith so that the same visibility effects as those of the monitor 111 as explained by FIG. 11 can be obtained. The display 121 of the stereoscopic monitor 120 and a lens board 122 for use in holding viewfield separation glasses 130 are fixed by a casing 123.

The display 121 is for example a LCD on which left and right images are alternately displayed in a time-sharing manner so as to allow left image to be displayed on a $P_L$ portion and right image to be displayed on a $P_R$ portion on a width $W_D$ of a display shown in the drawing so that the viewfield separation glasses 130 are made in synchronism with each other to separate the viewfield, thereby providing a stereoscopic view. Since the viewfield is covered with the casing 123 so as to be shielded from external light, images on the stereoscopic monitor can be clearly viewed even in an outdoor bright environment. Moreover, since the viewfield separation glasses are fixed to the display, no crosstalk occurs even when the viewer tilts his or her head.

The display of the stereoscopic monitor can be viewed in the same manner as in the display screen in reference dimension regardless of its large size or small size as explained by FIG. 3, by means of how to display images and viewing distances; however, from the viewpoint of portability, the smaller the display size, the better. In the case of a small display size, even a person who is looking straight ahead (with the naked eye having its focus adjusted at the distance of distinct vision) needs to use a visibility compensating lens (plus-diopter) shown in FIG. 13, and by shifting the visibility compensating lens 133 (not shown) in the optical axis direction, the adjustment can be made in accordance with the visibility of the viewer.

Figure 13:
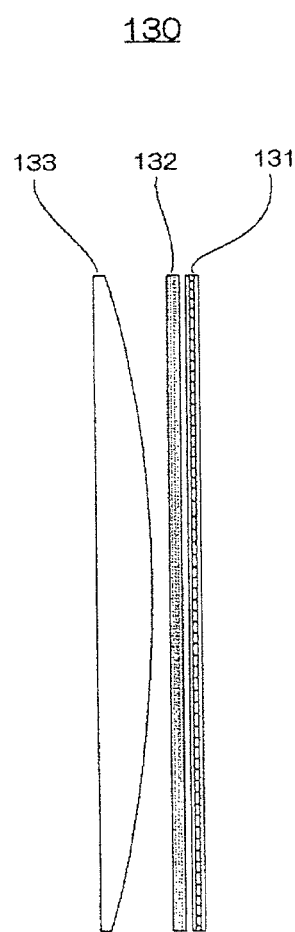
FIG. 13 is a cross-sectional view that shows viewfield separation glasses and visibility compensating glasses for the stereoscopic monitor.

FIG. 13 is a structural drawing that shows the viewfield separation glasses 130 of the stereoscopic monitor 120 of FIG. 12, which are mainly constituted by a polarizing plate 132 and a liquid crystal plate 131. When the display 121 of the stereoscopic monitor 130 of FIG. 12 is a LCD, display light is polarized light so that when the polarizing plate 132 shown in FIG. 13 is disposed in a direction orthogonal to the amplitude direction of the display light (on both of the left and right sides), the display light is blocked to cause a closed state in the viewfield. When the liquid crystal plate 131 is disposed in front of the polarizing plate 132 shown in the drawing, the display light of the LCD has its polarizing direction rotated by 90° or 270° to cause an opened state in the viewfield. When a voltage is applied to the liquid crystal plate 131 in this state, the liquid crystal that has been twisted is strained linearly so that the display light, as it is, is allowed to transmit without being rotated in its polarizing direction by the liquid crystal plate 131; thus, it is blocked by the polarizing plate 132 to cause the closed state in the viewfield. By applying a voltage to the liquid crystal plate 131 shown in FIG. 130 in synchronism with the displayed image of the display 121 shown in FIG. 12, the left and right viewfields are separated to provide a stereoscopic view. Additionally, in the above description, when a voltage is applied to the liquid crystal plate 131 shown in FIG. 13, the closed state in the viewfield is caused; however, in the case when the direction of the polarizing plate 132 is set in the same direction as that of the polarizing plate on the surface of the display (LCD) 121 shown in FIG. 12, upon application of a voltage to the liquid crystal plate, the opened state in the viewfield is caused.

Additionally, in the case when a non-polarized material such as organic EL is used for the display, by using so-called shutter glasses in which one more polarizing plate is further added to the front side of the liquid crystal plate 131, the same operations can be obtained. Moreover, in the case when a discharge lamp that turns on and off at a commercial frequency is viewed through the shutter glasses, flickers tend to be generated; however, in the stereoscopic monitor 120 of FIG. 12, since external light is blocked, and since light rays to be viewed through the viewfield separation glasses 130 are only the light rays derived from the display, no flickers are generated even if the viewfield separation glasses 130 are shutter glasses.

In the present invention, various modifications may be made within the scope not departing from the gist of the invention, and it is needless to say that the present invention covers those modified inventions.

INDUSTRIAL APPLICABILITY

Even in the case when the types of stereoscopic imaging devices are different, the present invention makes it possible to reproduce a faithful stereoscopic image on the display side without the need for any adjustments. Moreover, upon capturing stereoscopic images, any insufficient or excessive perspective far and near feeling tends to be caused depending on imaging conditions; however, even under any conditions, by adjusting the distance between imaging units, stereoscopic image data that is optimal for a stereoscopic view can be acquired so that the present invention is desirably applied to an image capturing process, in particular, for a stereoscopic movie, a stereoscopic television, etc.

EXPLANATION OF REFERENCE NUMERALS $W_{ref}$ Reference window
$W_W$ Width of reference window
$O^\infty$ Object at infinity
$\Phi$ Optical axis
$D_L$ Distance between optical axes
$I_{ref}$ Image of reference window projected on imaging elements
S Imaging element
f Focal length
$\Delta f$ Amount of focal point adjustment
$\alpha$ viewing angle
$W_S$ Width of imaging element
$D_S$ Distance between imaging elements
D Display
$W_D$ Width of display
$E_{ref}$ Equivalent reference window
B Interpupillary distance of a human
$E_L$ Left eye
$E_R$ Right eye
$D_0$ Reference dimension display
$D_1$ Display within overlapped display range
$D_2$ Display within left and right side-by-side disposed display range
$W_{P0}$ Width of reference dimension display
$W_{P1}$ Width of display within overlapped display range
$W_{P2}$ Width of display within left and right side-by-side disposed display range
$D_{P1}$ Distance of display within overlapped display range
$D_{P2}$ Distance of display within left and right side-by-side disposed display range
$L_X$ Border line (on principle) between left and right side-by-side disposed display range and overlapped display range
$L_W$ Distance of reference window
$L_0$ Distance of reference dimension display screen
$L_1$ Distance of display of overlapped display range
$L_2$ Distance of display of side-by-side disposed display range
$W_{ref}'$ Coincident point of left and right imaging viewfields with wide angle lens attached thereto
$W_{ref}''$ Coincident point of left and right imaging viewfields with long focal point lens attached thereto
$m_0$ Mode 0
$m_1$ Mode 1
$m_{10}$ Mode 10
$m_2$ Mode 2
$m_{20}$ Mode 20
$D_E$ Distance between optical axes extended to distance wider than interpupillary distance
$D_{SE}$ Distance between imaging elements with distance between optical axes set to $D_E$
$D_R$ Distance between optical axes reduced to distance narrower than interpupillary distance
$D_{SR}$ Distance between imaging elements with distance between optical axes set to $D_R$
100 Stereoscopic imaging device
101 Guide way
102 Slider
103 Imaging element
104 Imaging lens
105 Imaging unit
106 Rack
107 Pinion
110 Reference window
111 Stereoscopic monitor of stereoscopic television camera
112 Stereoscopic television camera
113 Stereoscopic image viewing glasses
114 Camera man
120 Stereoscopic monitor
121 Display
122 Lens board
123 Casing
130 Viewfield separation glasses
$P_L$ Display screen (left)
$P_R$ Display screen (right)
131 Liquid crystal plate
132 Polarizing plate
133 Visibility compensating lens
CP Viewing reference pattern

The invention claimed is:

1. A stereoscopic imaging device comprising: an imaging unit provided with imaging lenses and imaging elements, with optical axes of the imaging lenses being set laterally in parallel with each other to a distance that is equal to the interpupillary distance of a human, with one reference window being defined as a virtual viewfield frame in the imaging viewfield of the imaging unit, and with the set distance of reference window being determined at an arbitrary distance between a distance 30 times longer than the interpupillary distance and a distance nearer than a distance 50 times longer than the interpupillary distance, wherein the left and right imaging elements are arranged to match the width of the left and right projected images of the reference window in a state in which the reference window is projected to form reduced images by means of the left and right imaging lenses on the left and right imaging elements so that left and right image data is read and sent as standard stereoscopic image data.

2. A stereoscopic imaging device comprising: an imaging unit provided with imaging lenses and imaging elements, with optical axes of the imaging lenses being set laterally in parallel with each other to a distance that is narrower than the interpupillary distance of a human, and with one reference window being defined as a virtual viewfield frame in the imaging viewfield of the imaging unit, wherein supposing that the set distance of the reference window is $L_W$, the distance between optical axes of the left and right imaging lenses is $D_R$, the focal length of the imaging lens is f and the focus adjusting amount is Δf, the set distance of the reference window $L_W$ and the distance between optical axes of the left and right imaging lenses $D_R$ are arranged so as to have a relationship represented by $50>(L_W/D_R)>30$, with the distance $D_S$ of the left and right imaging elements being arranged so as to have a relationship represented by $D_S=D_R(1\ (f+\Delta f)/L_W)$, so that left and right image data is read and sent as standard stereoscopic image data.

3. A stereoscopic imaging device comprising: an imaging unit provided with imaging lenses and imaging elements, with optical axes of the imaging lenses being set laterally in parallel with each other to a distance that is wider than the interpupillary distance of a human, and with one reference window being defined as a virtual viewfield frame in the imaging viewfield of the imaging unit, wherein supposing that the set distance of the reference window is $L_W$, the distance between optical axes of the left and right imaging lenses is $D_E$, the focal length of the imaging lens is f and the focus adjusting amount is Δf, the set distance of the reference window $L_W$ and the distance between optical axes of the left and right imaging lenses $D_E$ are arranged so as to have a relationship represented by $50>(L_W/D_E)>30$, with the distance $D_S$ of the left and right imaging elements being arranged so as to have a relationship represented by $D_S=D_E(1+(f+\Delta f)/L_W)$, so that left and right image data is read and sent as standard stereoscopic image data.

4. A stereoscopic imaging device comprising: left and right two imaging units that are fixed with a constant distance or have a distance variable structure, wherein, based upon a structure of the stereoscopic imaging device as a reference in which left and right optical axes of the stereoscopic imaging device are set laterally in parallel with each other to a distance of the optical axes that is equal to the interpupillary distance of a human, with one reference window being defined as a virtual viewfield frame in the viewfield of each of the left and right imaging lenses of the imaging unit, with the set distance of reference window being determined at an arbitrary distance between a distance 30 times longer than the interpupillary distance and a distance nearer than a distance 50 times longer than the interpupillary distance, and with the left and right imaging elements being arranged to match the width of the projected image of the reference window projected by each of the left and right imaging lenses, so that left and right image data is read and sent as standard stereoscopic image data, the distance between the left and right imaging units of the stereoscopic device is increased so that by setting the distance between optical axes of the left and right imaging lenses greater than the interpupillary distance of a human, the set distance of the reference window is proportionally increased automatically at the time of imaging in accordance with the set value of the distance between optical axes and an attempt is made so as to emphasize a perspective far and near feeling.

5. A stereoscopic imaging device comprising: left and right two imaging units that are fixed with a constant distance or have a distance variable structure, wherein, based upon a structure of the stereoscopic imaging device as a reference in which left and right optical axes of the stereoscopic imaging device are set laterally in parallel with each other to a distance of the optical axes that is equal to the interpupillary distance of a human, with one reference window being defined as a virtual viewfield frame in the viewfield of each of the left and right imaging lenses of the imaging unit, with the set distance of reference window being determined at an arbitrary distance between a distance 30 times longer than the interpupillary distance and a distance nearer than a distance 50 times longer than the interpupillary distance, and with the left and right imaging elements being arranged to match the width of the projected image of the reference window projected by each of the left and right imaging lenses, so that left and right image data is read and sent as standard stereoscopic image data, the distance between the left and right imaging units of the stereoscopic device is reduced so that by setting the distance between optical axes of the left and right imaging lenses smaller than the interpupillary distance of a human, the set distance of the reference window is proportionally reduced automatically at the time of imaging in accordance with the set value of the distance between optical axes and an optimal joined state of left and right viewfields is obtained even in a close-distance imaging capturing process.

6. A stereoscopic imaging device comprising: left and right two imaging units that are attached onto a guide way so as to slide thereon in an engaged state, that is, so as to have a distance variable structure, wherein optical axes of the stereoscopic imaging device are set to a distance that is equal to the interpupillary distance of a human, with the left and right optical axes being in parallel with each other, with one reference window being installed so that the reference window is defined as a virtual viewfield frame in the viewfield of each of the left and right imaging lenses, with the set distance of the reference window being determined at an arbitrary distance between a distance 30 times longer than the interpupillary distance and a distance nearer than a distance 50 times longer than the interpupillary distance, and with the left and right imaging elements being arranged to match the width of the projected image of the reference window projected by each of the left and right imaging lenses, so that left and right image data is read and sent as standard stereoscopic image data, and wherein a zoom lens is attached to each of the left and right units of the stereoscopic imaging device formed based upon the optical conditions so that the unit distance between the zoom lenses is driven and adjusted by a servomotor or the like.

7. The stereoscopic imaging device according to claim 1 or claim 6, wherein the focal point adjusting distance of the left and right imaging lenses is fixed to a distance that is farther from the reference window.

8. The stereoscopic imaging device according to any one of claims 1, 2, 3, 4, 5, 6 and 7, wherein by using the imaging elements having a width larger than the width of a projected image of the reference window, left and right stereoscopic image data corresponding to the width of the projected image of the reference window, or the like, is selectively read and sent as standard stereoscopic image data.

9. The stereoscopic imaging device according to any one of claims 1, 2, 3, 4, 5, 6 and 7, wherein an electronic stereoscopic view finder that allows the left and right eyes to view the respective left and right images of a stereoscopic image to provide a stereoscopic view of the image is installed and by displaying left and right same viewing reference patterns on the same positions of left and right display screens of the electronic view finder in a superimposed manner by means of software, the stereoscopic image and the viewing reference patterns are simultaneously viewed stereoscopically so that the set position of the reference window becomes recognizable.

10. A stereoscopic imaging device for providing standard stereoscopic image data to reproduce a stereoscopic image comprising:
   a reference window forming a virtual viewfield frame;
   left and right imaging elements;
   left and right imaging lenses having parallel optical axis separated by a distance, said left and right imaging lenses placed between said reference window and said left and right imaging elements, said left and right imaging lenses positioned so as to form reduced images of the virtual viewfield frame on a respective one of said left and right imaging elements; and
   wherein said reference window is set at a distance from said left and right imaging lenses of between a distance 30 times longer than an interpupillary distance of a human and a distance nearer than a distance 50 longer than the interpupillary distance of a human,
   whereby left and right image data from said left and right imaging elements is capable of being read and sent as standard stereoscopic data to faithfully reproduce a stereoscopic image.

11. A stereoscopic imaging device providing standard stereoscopic image data to reproduce a stereoscopic image comprising:
   an imaging side comprising,
   a reference window forming a virtual viewfield frame having a reference window width;
   left and right imaging elements each having an imaging element width;
   left and right imaging lenses having parallel optical axis separated by a distance, said left and right imaging lenses placed between said reference window and said left and right imaging elements, said left and right imaging lenses positioned so as to form reduced images of the virtual viewfield frame on a respective one of said left and right imaging elements;
   wherein said reference window is set at a distance from said left and right imaging lenses of between a distance 30 times longer than an interpupillary distance of a human and a distance nearer than a distance 50 longer than the interpupillary distance of a human;
   wherein the ratio of the image element width to the reference window width defines an image scaling factor;
   a display side comprising,
   a display screen having a display screen width;
   wherein the ratio of the display screen width to the imaging element width defines a display scaling factor; and
   wherein the product of the image scaling factor and the display scaling factor is one,
   whereby regardless of the image element width image data from the image side is easily formed into standard stereoscopic image data to faithfully reproduce a stereoscopic image.

12. A stereoscopic imaging device comprising:
   left and right two imaging units that are fixed with a constant distance or have a distance variable structure,
   wherein, based upon a structure of the stereoscopic imaging device as a reference in which left and right optical axes of the stereoscopic imaging device are set laterally in parallel with each other to a distance of the optical axes that is equal to the interpupillary distance of a human, with one reference window being defined as a virtual viewfield frame in the viewfield of each of the left and right imaging lenses of the imaging unit, with the set distance of reference window being determined at an arbitrary distance between a distance 30 times longer than the interpupillary distance and a distance nearer than a distance 50 times longer than the interpupillary distance, and with the left and right imaging elements being arranged to match the width of the projected image of the reference window projected by each of the left and right imaging lenses, so that left and right image data is read and sent as standard stereoscopic image data, the distance between the left and right imaging units of the stereoscopic device is increased so that by setting the distance between optical axes of the left and right imaging lenses greater than the interpupillary distance of a human, the set distance of the reference window is proportionally increased automatically at the time of imaging in accordance with the set value of the distance between optical axes and an attempt is made so as to emphasize a perspective far and near feeling, and
   wherein installation reference surfaces of the imaging units are formed at respective longitudinal positions of a main body so as to have a longitudinally symmetric structure,
   whereby either one of the imaging units may be prepared by longitudinally inverting one of the imaging units reducing manufacturing cost.

13. A stereoscopic imaging device comprising:
   left and right two imaging units that are fixed with a constant distance or have a distance variable structure,
   wherein, based upon a structure of the stereoscopic imaging device as a reference in which left and right optical axes of the stereoscopic imaging device are set laterally in parallel with each other to a distance of the optical axes that is equal to the interpupillary distance of a human, with one reference window being defined as a virtual viewfield frame in the viewfield of each of the left and right imaging lenses of the imaging unit, with the set distance of reference window being determined at an arbitrary distance between a distance 30 times longer than the interpupillary distance and a distance nearer than a distance 50 times longer than the interpupillary distance, and with the left and right imaging elements being arranged to match the width of the projected image of the reference window projected by each of the left and right imaging lenses, so that left and right image data is read and sent as standard stereoscopic image data, the distance between the left and right imaging units of the stereoscopic device is reduced so that by setting the distance between optical axes of the left and right imaging lenses smaller than the interpupillary distance of a human, the set distance of the reference window is proportionally reduced automatically at the time of imaging in accordance with the set value of the distance between optical axes and an optimal joined state of left and right viewfields is obtained even in a close-distance imaging capturing process, and
   wherein installation reference surfaces of the imaging units are formed at respective longitudinal positions of a main body so as to have a longitudinally symmetric structure,
   whereby either one of the imaging units may be prepared by longitudinally inverting one of the imaging units reducing manufacturing cost.

14. A stereoscopic imaging device comprising:
left and right two imaging units that are attached onto a guide way so as to slide thereon in an engaged state, that is, so as to have a distance variable structure,
wherein optical axes of the stereoscopic imaging device are set to a distance that is equal to the interpupillary distance of a human, with the left and right optical axes being in parallel with each other, with one reference window being installed so that the reference window is defined as a virtual viewfield frame in the viewfield of each of the left and right imaging lenses, with the set distance of the reference window being determined at an arbitrary distance between a distance 30 times longer than the interpupillary distance and a distance nearer than a distance 50 times longer than the interpupillary distance, and with the left and right imaging elements being arranged to match the width of the projected image of the reference window projected by each of the left and right imaging lenses, so that left and right image data is read and sent as standard stereoscopic image data, and
wherein a zoom lens is attached to each of the left and right units of the stereoscopic imaging device formed based upon the optical conditions so that the unit distance between the zoom lenses is driven and adjusted by a servomotor or the like, and
wherein installation reference surfaces of the imaging units are formed at respective longitudinal positions of a main body so as to have a longitudinally symmetric structure,
whereby either one of the imaging units may be prepared by longitudinally inverting one of the imaging units reducing manufacturing cost.

15. A stereoscopic imaging device comprising:
left and right two imaging units that are fixed with a constant distance or have a distance variable structure,
wherein, based upon a structure of the stereoscopic imaging device as a reference in which left and right optical axes of the stereoscopic imaging device are set laterally in parallel with each other to a distance of the optical axes that is equal to the interpupillary distance of a human, with one reference window being defined as a virtual viewfield frame in the viewfield of each of the left and right imaging lenses of the imaging unit, with the set distance of reference window being determined at an arbitrary distance between a distance 30 times longer than the interpupillary distance and a distance nearer than a distance 50 times longer than the interpupillary distance, and with the left and right imaging elements being arranged to match the width of the projected image of the reference window projected by each of the left and right imaging lenses, so that left and right image data is read and sent as standard stereoscopic image data, the distance between the left and right imaging units of the stereoscopic device is increased so that by setting the distance between optical axes of the left and right imaging lenses greater than the interpupillary distance of a human, the set distance of the reference window is proportionally increased automatically at the time of imaging in accordance with the set value of the distance between optical axes and an attempt is made so as to emphasize a perspective far and near feeling,
wherein each imaging units has reference surfaces to install them at upper and lower portions of main body, and a distance from upper and lower reference surfaces to the center of the imaging lens is set equally.

16. A stereoscopic imaging device comprising:
left and right two imaging units that are fixed with a constant distance or have a distance variable structure,
wherein, based upon a structure of the stereoscopic imaging device as a reference in which left and right optical axes of the stereoscopic imaging device are set laterally in parallel with each other to a distance of the optical axes that is equal to the interpupillary distance of a human, with one reference window being defined as a virtual viewfield frame in the viewfield of each of the left and right imaging lenses of the imaging unit, with the set distance of reference window being determined at an arbitrary distance between a distance 30 times longer than the interpupillary distance and a distance nearer than a distance 50 times longer than the interpupillary distance, and with the left and right imaging elements being arranged to match the width of the projected image of the reference window projected by each of the left and right imaging lenses, so that left and right image data is read and sent as standard stereoscopic image data, the distance between the left and right imaging units of the stereoscopic device is reduced so that by setting the distance between optical axes of the left and right imaging lenses smaller than the interpupillary distance of a human, the set distance of the reference window is proportionally reduced automatically at the time of imaging in accordance with the set value of the distance between optical axes and an optimal joined state of left and right viewfields is obtained even in a close-distance imaging capturing process,
wherein each imaging units has reference surfaces to install them at upper and lower portions of main body, and a distance from upper and lower reference surfaces to the center of the imaging lens is set equally.

17. A stereoscopic imaging device comprising:
left and right two imaging units that are attached onto a guide way so as to slide thereon in an engaged state, that is, so as to have a distance variable structure,
wherein optical axes of the stereoscopic imaging device are set to a distance that is equal to the interpupillary distance of a human, with the left and right optical axes being in parallel with each other, with one reference window being installed so that the reference window is defined as a virtual viewfield frame in the viewfield of each of the left and right imaging lenses, with the set distance of the reference window being determined at an arbitrary distance between a distance 30 times longer than the interpupillary distance and a distance nearer than a distance 50 times longer than the interpupillary distance, and with the left and right imaging elements being arranged to match the width of the projected image of the reference window projected by each of the left and right imaging lenses, so that left and right image data is read and sent as standard stereoscopic image data,
wherein a zoom lens is attached to each of the left and right units of the stereoscopic imaging device formed based upon the optical conditions so that the unit distance between the zoom lenses is driven and adjusted by a servomotor or the like, and
wherein each imaging units has reference surfaces to install them at upper and lower portions of main body, and a distance from upper and lower reference surfaces to the center of the imaging lens is set equally.

* * * * *